June 2, 1931. V. HENDRICKSON 1,807,843
MACHINE FOR FORMING COMPOSITE CAN BODIES
Original Filed June 27, 1925 9 Sheets-Sheet 1

Fig. 1.

INVENTOR
Victor Hendrickson
BY
Jeffery, Kimball & Eggleton
ATTORNEYS

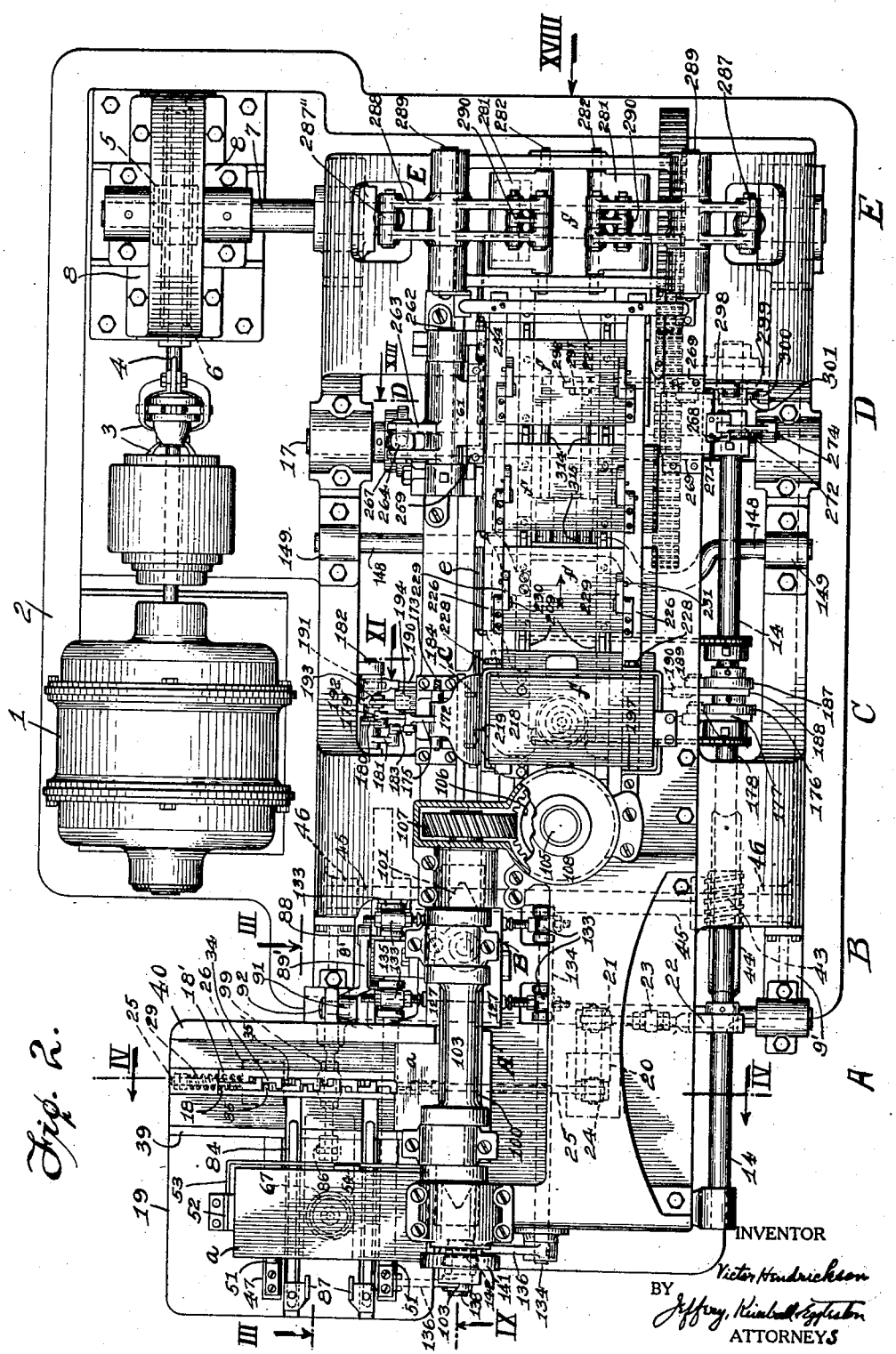

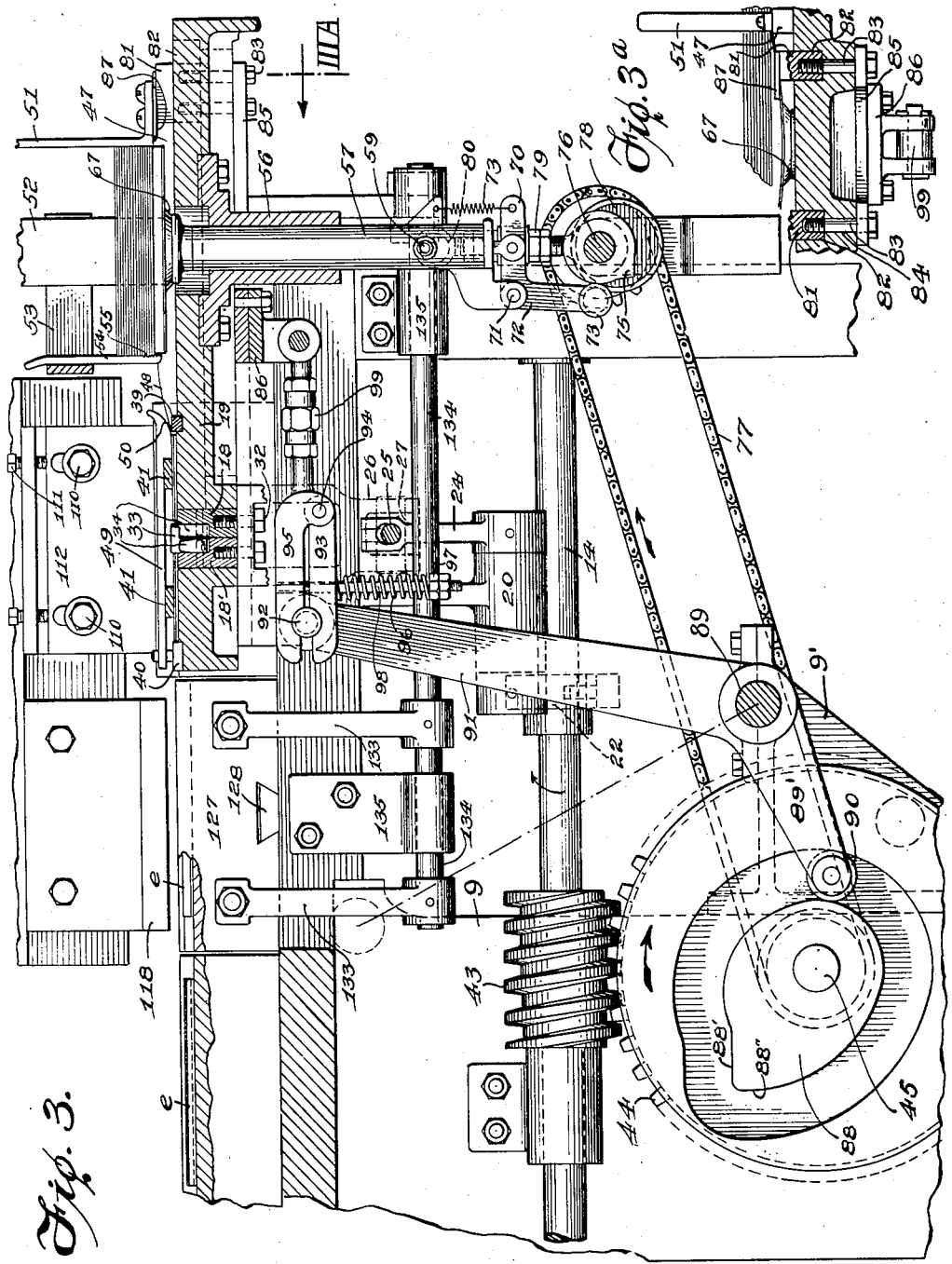

June 2, 1931. V. HENDRICKSON 1,807,843
MACHINE FOR FORMING COMPOSITE CAN BODIES
Original Filed June 27, 1925 9 Sheets-Sheet 4
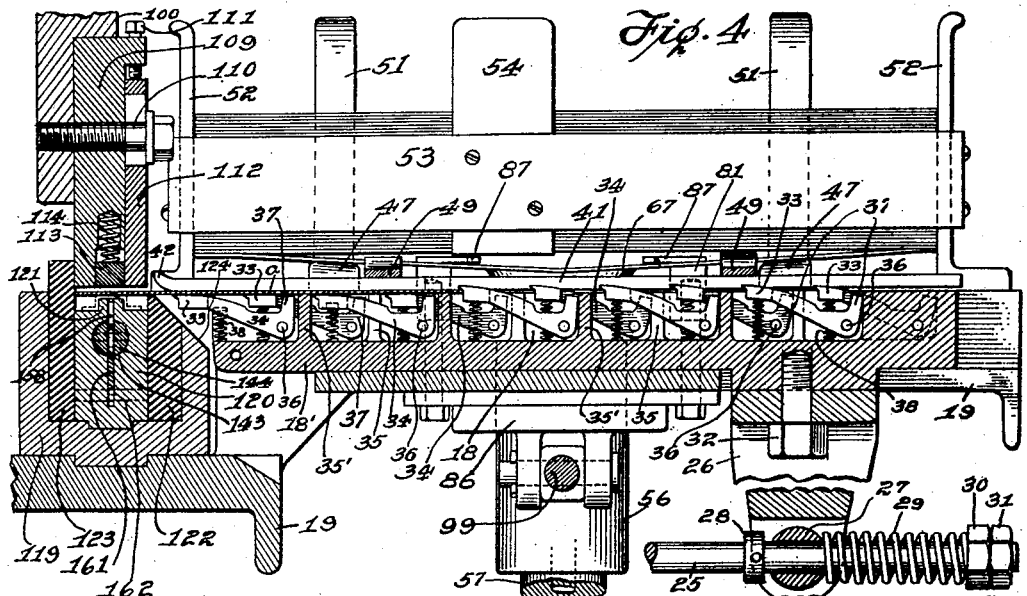
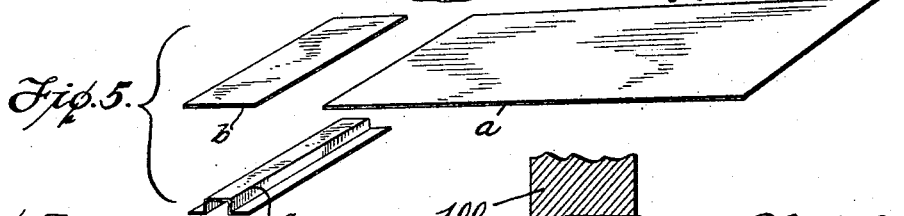
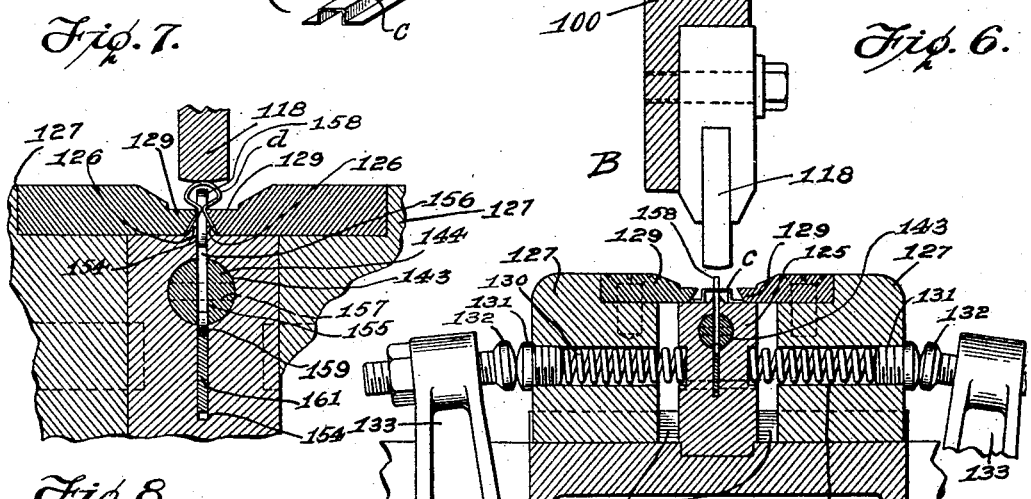
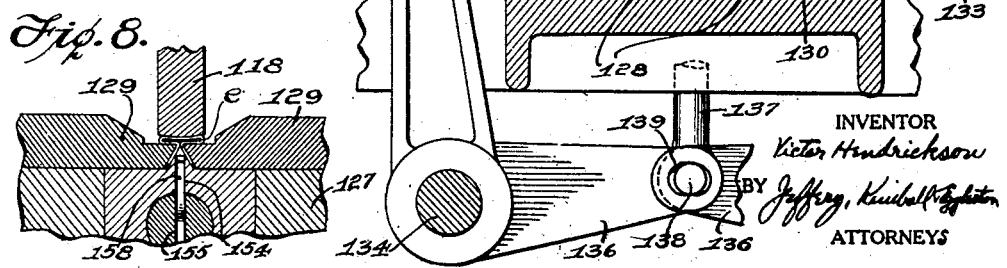

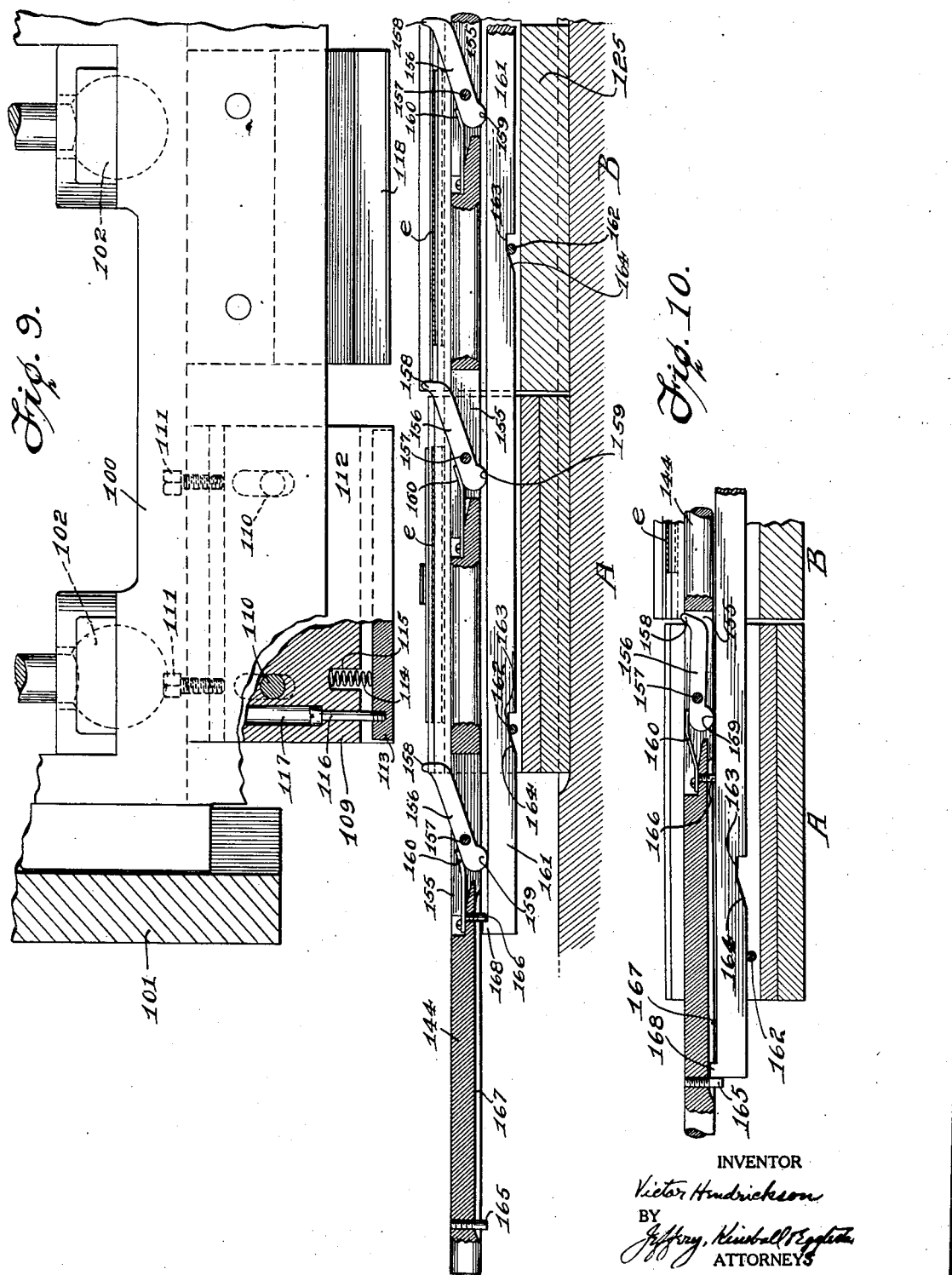
June 2, 1931 — V. HENDRICKSON — 1,807,843
MACHINE FOR FORMING COMPOSITE CAN BODIES
Original Filed June 27, 1925 — 9 Sheets-Sheet 5

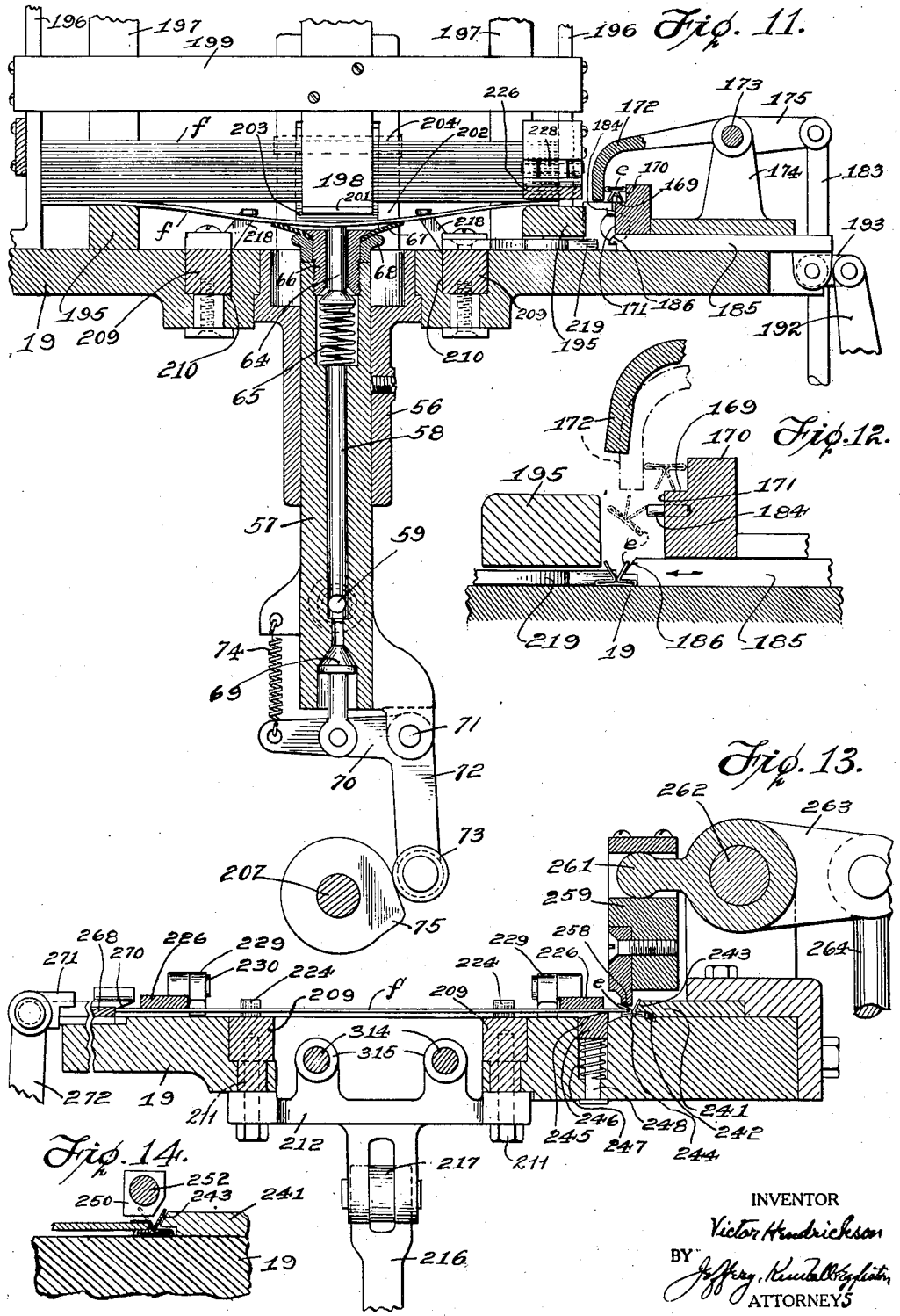

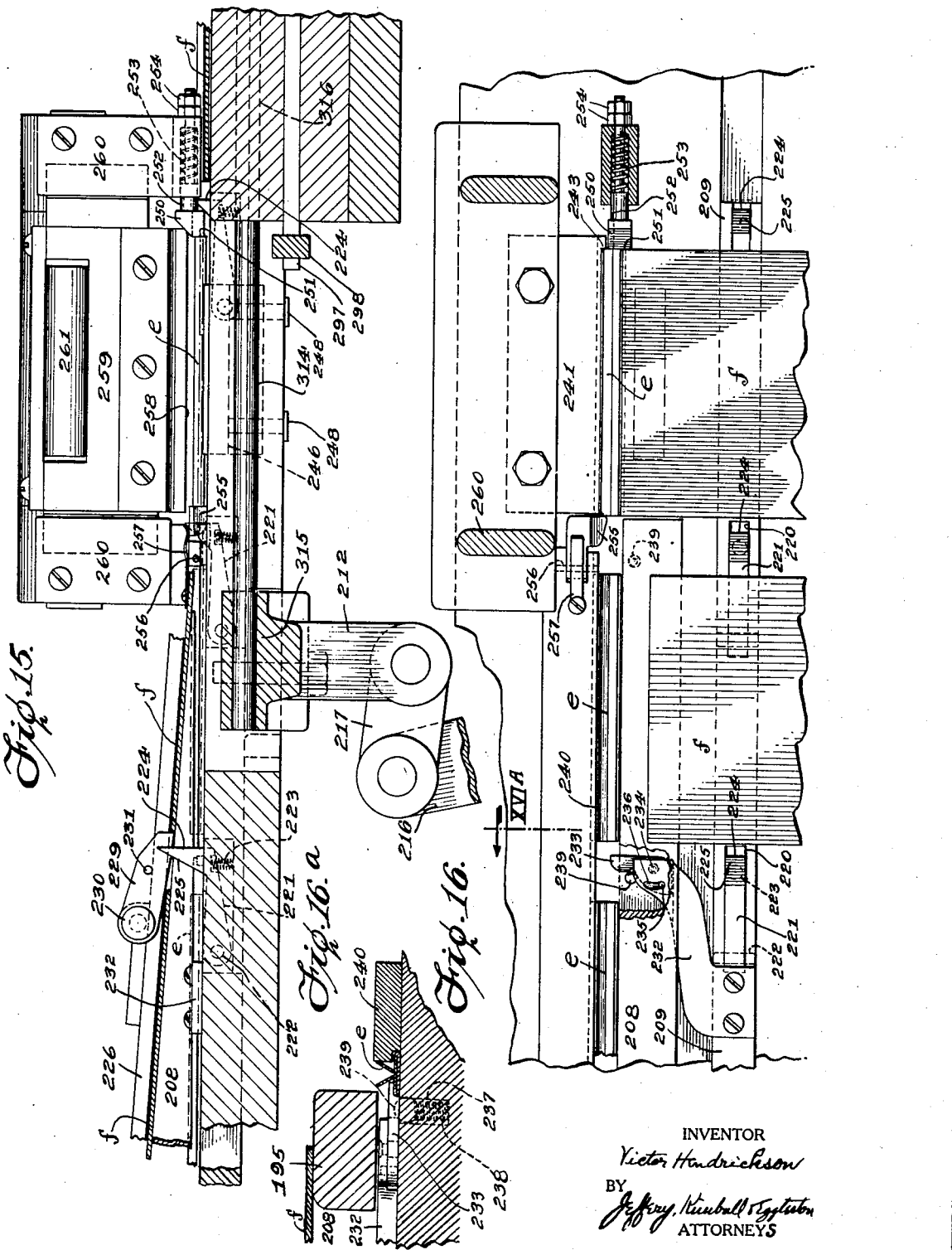

June 2, 1931. V. HENDRICKSON 1,807,843
MACHINE FOR FORMING COMPOSITE CAN BODIES
Original Filed June 27, 1925 9 Sheets-Sheet 8
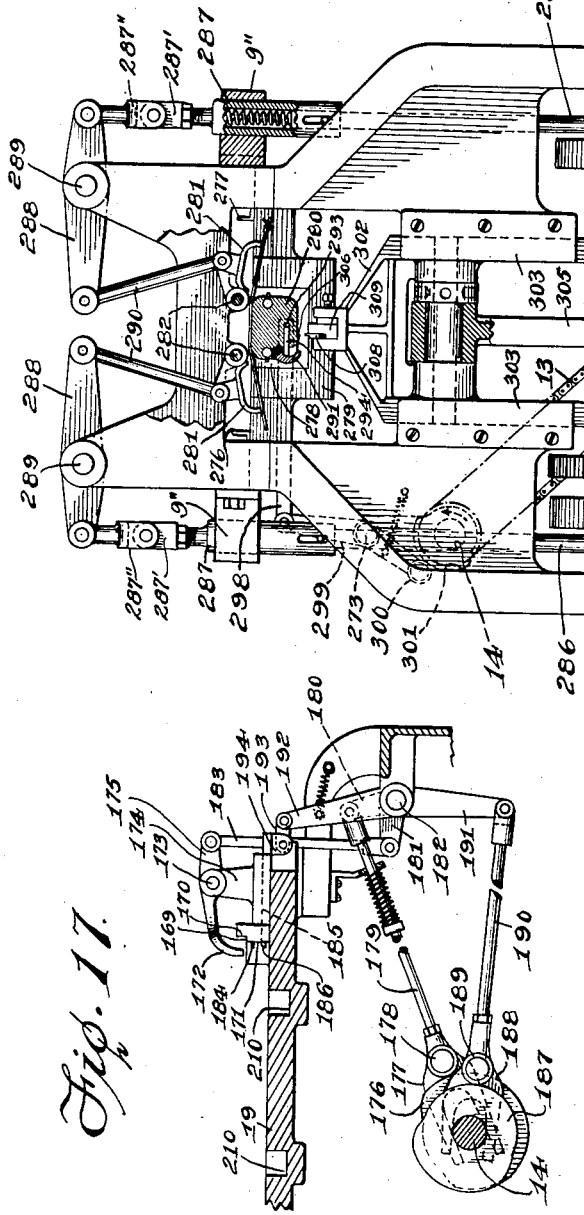
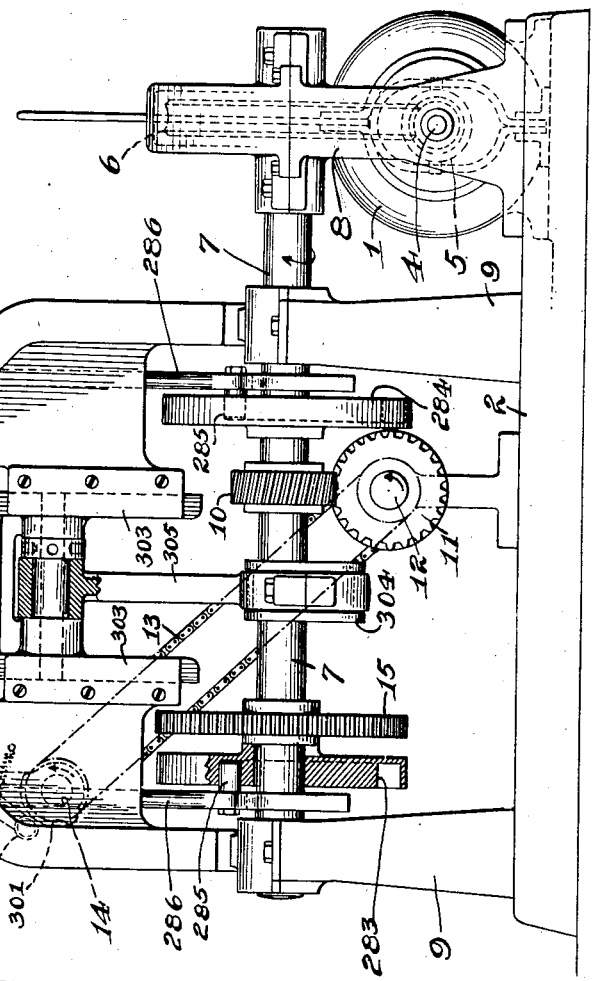
INVENTOR
Victor Hendrickson
BY
Jeffery, Kimball & Eighton
ATTORNEYS

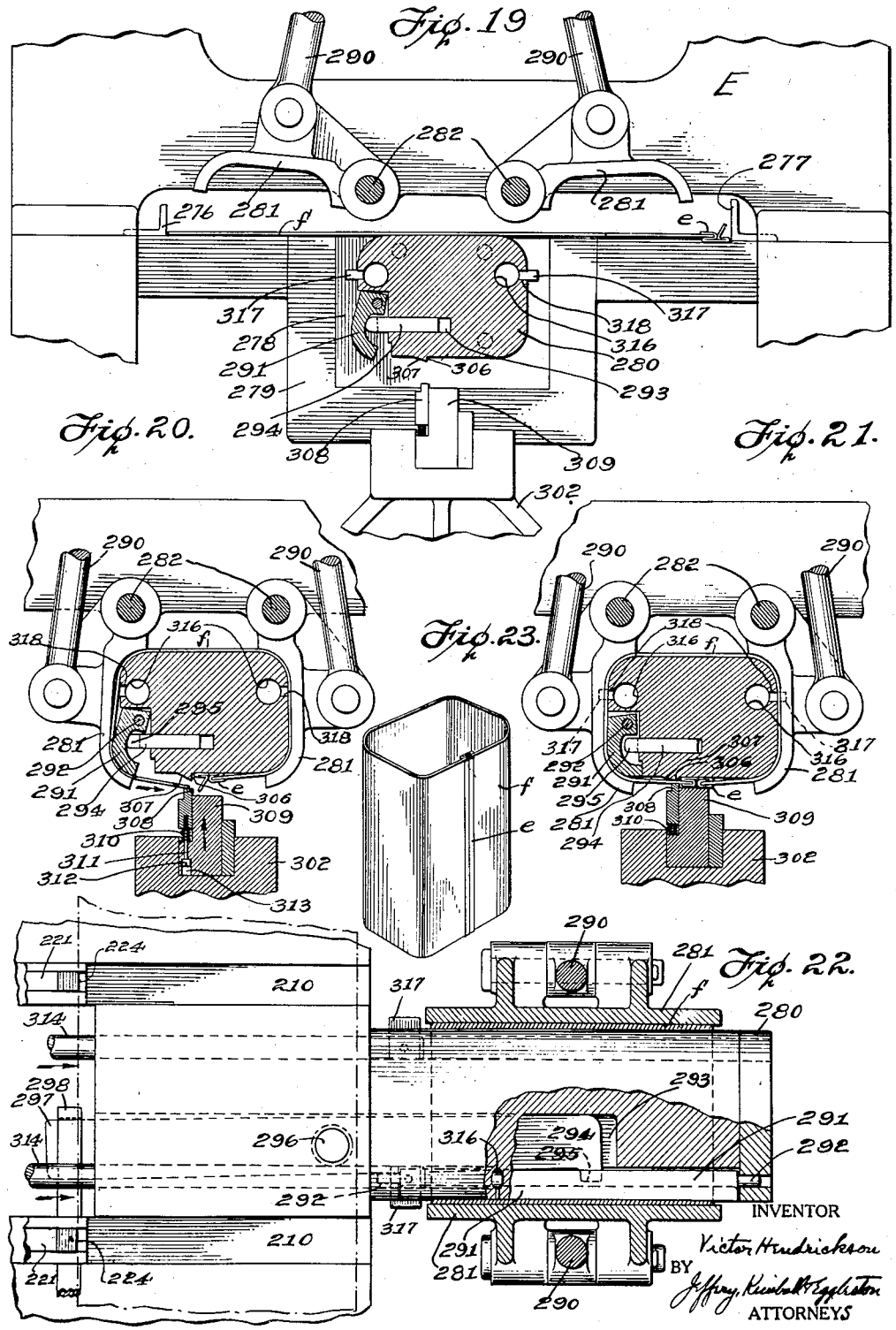

Patented June 2, 1931

1,807,843

UNITED STATES PATENT OFFICE

VICTOR HENDRICKSON, OF MANCHESTER, CONNECTICUT, ASSIGNOR TO THE ORFORD SOAP COMPANY, INC., OF MANCHESTER, CONNECTICUT, A CORPORATION OF CONNECTICUT

MACHINE FOR FORMING COMPOSITE CAN BODIES

Application filed June 27, 1925, Serial No. 39,903. Renewed April 18, 1929.

This invention provides in a single machine coordinated and aptly related mechanisms for performing all the operations incident to the production of a composite can body of known structure, the opposed edges of whose formed fibre body blank are secured together by a sheet metal seaming strip. These operations in the machine shown in the drawings consist, in addition to blank separation and feeding, of cutting up a sheet metal blank and forming it into seaming strips, reversing such strips and applying them individually to one edge of a can body blank, forming the blank into the desired can body shape, securing the seaming strip to the opposite edge of the formed body blank, and ejecting the finished can body. These operations are continuously performed at a series of stations arranged successively lengthwise of the machine, suitable mechanisms being provided for effecting the requisite transfers, so that a continuous procession of stock under treatment and of finished can bodies passes through the machine. The feed of the blanks etc. is in general edgewise and the body blanks being handled flat may be printed as desired in advance. The invention consists in the combination of related mechanisms for performing operations referred to, in the several means for effecting the various operations, in the blank separating and feeding devices and in the various other feed mechanisms, all of which present features novel in themselves as well as in the combinations of which they form members, in the power applying means, and in other features of the invention illustrated in the drawings and pointed out in the specification or apparent therefrom to those skilled in the art.

Referring to the drawings:

Fig. 1 is a side elevation of the machine, parts of the frame being broken away as indicated and parts of the body blank magazine and feed mechanism etc. being shown in section. The respective stations are indicated on this and on Fig. 2 by the letters A, B, C, D, E.

Fig. 2 is a plan.

Fig. 3 is a vertical section on the line III—III, Fig. 2.

Fig. 3ª is a transverse section on the line IIIA, Fig. 3.

Fig. 4 is a vertical section at station A on the line IV—IV, Fig. 2, showing the first set of seaming strip forming dies and the direct blank feed slide thereto.

Fig. 5 shows in perspective a sub-blank sheared from the main sheet metal blank, the remainder of which is also shown, and below the severed parts of the blank, the seaming strip after the first forming operation.

Fig. 6 is a transverse section at station B through the second set of forming dies ready to operate on the partly formed strip.

Fig. 7 is a like view in which the dies have performed the first stage of the second forming operation, and Fig. 8, a like view showing the conclusion of the second forming operation.

Fig. 9 is a vertical section, partly in elevation, on the line IX, Fig. 2, the line of endwise feed of the seaming strip from stations A and B, showing the feed dogs projected into feeding position.

Fig. 10 is a fragmentary detail view corresponding to Fig. 9 and showing the feed dogs in retracted position.

Fig. 11 is an irregular detail section at station C on the line XI, Fig. 2, across the lines of strip and blank feed.

Fig. 12 is a fragmentary detail section corresponding, except as to the position of certain movable parts, to Fig. 11 but confined to the strip reversing means and strip feeding means.

Fig. 13 is a vertical section at station D across the line of can body and strip feed on the line XIII, Fig. 2.

Fig. 14 is a detail cross section, taken at a point a little beyond the plane of the section of Fig. 13 in the direction of the feed.

Fig. 15 is a vertical section lengthwise of the machine through the slide which feeds the body blank and the formed seaming strip looking toward the far side of the machine.

Fig. 16 is a plan view corresponding to

Fig. 15, parts being broken away and omitted in both figures for clearness.

Fig. 16ª is a cross section on the line XVIA Fig. 16.

Fig. 17 is a detail cross section showing in elevation the operating connections for the abutment strip and seaming strip cross feed at station C.

Figure 18 is an end elevation looking in the direction of the arrow XVIII, in Fig. 2, toward station E, certain parts being shown in section.

Figs. 19, 20 and 21 are detail views of the same character as Fig. 18, showing successive stages in the formation of the can body and the clinching of the free flange of the seaming strip onto the adjacent edge of the can body blank to complete the can body.

Figure 22 is a detail plan, partly in section, showing the means for operating the internal wing of the former horn and the means for ejecting the completed can body, the parts being in the same relation as in Figure 21.

Figure 23 is a perspective view of the completed can body.

The general lay-out of the machine and the relative location of the principal mechanisms is shown in Figures 1 and 2, the feed being in general from left to right in these figures. Apart from the means for feeding the blanks and the partially and completely formed seaming strip and aside from other transfers, the principal operations of the illustrated machine are as follows and are performed at the stations A, B, C, D, E: station A—sheet metal blank shearing and preliminary seaming strip forming; station B—completion of the strip forming operation; station C—strip reversing and shifting crosswise to new line of endwise feed; station D—applying seaming strip to can body blank; station E—body forming, strip clinching and ejecting. The blank feeds to station A are shown in Figs. 1–4 (the sucker details being as in Fig. 11), the station A and station B mechanism in Figs. 1 to 10, (successive operations of the strip forming dies being shown in Figs. 4, 6, 7 and 8), the endwise feed of the partially and completely formed seaming strips to station C in Figs. 1, 4, 6, 7, 8 and especially 9 and 10, the mechanism for performing the station C operations in Figs. 2, 11, 12 and 17, the body blank and strip feed lengthwise of the machine from station C in Figs. 1, 2, 11 and 13 and 15–16ª, the mechanism for performing the station D operations in Figs. 1, 2, and 13–16, and the mechanism for performing station E operations in Figures 1, 2, and 18–22.

The means for developing and delivering power to the mechanisms to be hereinafter described in detail, but which as a measure of convenience are here named in advance, are shown in Figures 1, 2, 3 and 18. The source of power may conveniently be the motor 1 mounted on the base 2 of the machine and through the clutch and clutch-applying means 3 driving the shaft 4 whose worm 5 meshes with the worm wheel 6 on the main drive shaft 7 thus driven at much reduced speed, said shaft being supported from the base in standard 8, wherein also the end of the shaft 4 is mounted, and in standards forming part of the side frames 9. This shaft 7 operates the can body formers at station E and through spiral gears 10, 11 without speed change drives a longitudinal shaft 12 from which power is delivered by connections hereinafter described to the reciprocating die cross head at stations A and B. The shaft 12 by chain 13 drives at the same speed the upper longitudinal drive shaft 14 which operates the direct feed to station A, the abutment trip and the pusher mechanism at station C, the body blank pusher mechanism at station D and the mechanism for operating the wing of the former horn at station E all hereinafter fully described. Power for the initial blank separation and feed to the direct feed mechanism supplying station A is indirectly derived from said shaft, as is also power for operating the pneumatic sucker opposite station C. A separate motor, as indicated in the lower part of Figure 1, is provided for driving the air pump which creates negative pressure in the suckers. Gear 15 on the main drive shaft 7 through an identical gear 16 drives counter-shaft 17 (Fig. 1) from which is driven the means for feeding the strip step by step endwise from A to B to C and the means for feeding the body blank and the strip together, lengthwise of the machine from C by successive steps to D and E, and for ejecting the finished blank. The strip-clinching mechanism at station D is also operated from the counter-shaft 17.

The feeds to station A (Figs. 1, 2, 3 and 4) are an initial feed lengthwise of the machine of the main sheet metal blanks, and a much more rapid feed crosswise of the machine direct to the blank cutting up and preliminary forming dies, and to which the initial feed periodically delivers. These mechanisms broadly considered are feeds, and like the other feed and transfer mechanisms of this machine, have general utility as such, although they are especially adapted to the requirements of this machine and are effectively coordinated and combined with its other mechanisms. The direct feed will be described first since its requirements necessarily determine the operation of the initial feed. The direct feed slide 18, 18' (Figs. 2, 3 and 4) is mounted in a slot in the top of the table 19 for rapid reciprocation toward and from the dies at station A, being operated from the upper longitudinal drive shaft 14 by connections including a bell-crank mounted in a bracket 20 on the frame and having in parallel planes an arm 21 actuated by eccentric 22 on shaft 14 through link 23 and an arm 24 connected by rod 25 to the yoke 26 secured to the feed slide 18, 18', the rod 25 being slidable endwise in the pivot pin 27 by which it is secured to the arms of the yoke and being provided with a thrust collar 28 fast to the rod in advance of the pivot pin and with a spring 29 in rear of the pivot pin and between the same and the adjusting and lock nuts 30, 31. By this arrangement a yielding-pressure or continued pushing on the slide is secured at the close of each forward feed stroke. The feed slide may conveniently be formed in two parts 18 and 18' mutually abutting on the central longitudinal plane of the slide and individually secured to the yoke 26 by screw bolts 32. Feed dogs, equal in number to the number of sub-blanks into which the main blank is to be divided and each longer than the width of a sub-blank, are mounted in the slide in a fore and aft series with their heads 33 in line and symmetrical with respect to said plane, and their bodies 34 in parallel planes at opposite sides of said plane, the arrangement being such that adjacent dogs overlap and are staggered, their heads projecting alternately in opposite directions across said central longitudinal plane and over the body of the adjacent dog which slants downward and is hollowed out on top for that purpose. This is a convenient arrangement permitting longer dogs to be used than if there were no overlap. The assemblage of the dogs in this relation is most readily effected where the slide is made in two parts each of which has a front to rear series of recesses of substantially the thickness of the bodies of the dogs, open at the top and side and located between inwardly projecting vertical ribs, 35 on the part 18 and 35' on the part 18', staggered with respect to each other as are the opposed intervening recesses themselves. In each such recess a dog is pivoted on a pin 36, its body lying between the side wall of its recess and the face of one of the ribs on the other part, its head projecting out of the open side of the recess and its tail 37 being adapted to coact as a stop with the side of the adjacent rib on its own part, each dog being normally pressed to feed position by a spring 38. In this way each of the two sets of dogs which together make up the entire series may be separately assembled in one of the slide parts, and the two distinct pre-assembled units thus formed brought together sidewise and secured to the slide-operating yoke. It will be understood that instead of a series of recesses in each of the two dog supports the space might be continuous, the recesses being however preferred. The foremost dog as shown in Fig. 4 projects beyond the end of the slide through the open front end of its recess. Guide strips 39, 40 are let into the top of the table at each side of the blank path. Parallel hold-down strips 41 symmetrically located between the strips 39, 40 at each side of the central longitudinal plane of the feed slide just above the path of the blank serve to keep it in contact with the feed dogs and insure its proper feed and delivery and tend to prevent blank retraction on the rearward stroke. The front ends of these strips are upwardly curved at 42 to facilitate the feed.

Assuming that a blank has been fed to the direct feed slide, the operation is as follows: The head of the rearmost dog as the slide moves forward takes over the rear edge of the blank, the heads of the other dogs being depressed into their respective recesses by the blank which lies on the table 19 and on the slide 18, 18'. The slide having fed the blank under the cutting and forming dies and against the stop-surface which, as will be hereinafter explained, forms part thereof, the end of the blank is cut off and the feed slide moves back and on its next forward stroke the second dog from the rear acts and so on successively until the front dog effects the final feed, whereupon the initial feed again comes into play. It will be apparent that the feeding means, and in particular the arrangement of dogs described, though novel and advantageous, is not indispensable to the more general combination recited, or, indeed, to the operation just described, and that other suitable structure may be substituted.

The initial blank separating and feeding mechanism, since the ratio of its feed to the direct feed to the blank cutting up and forming dies is as one to the number of the sub-blanks into which each blank is to be cut—in the machine illustrated ten—, must be driven at this reduced rate. This is accomplished by providing the upper longitudinal drive shaft 14 with a worm 43 meshing with a worm wheel 44 on the transverse shaft 45 having its ends mounted in lugs 46 on the opposite side members of the frame, the velocity ratio of shaft 14 to shaft 45 being ten to one. The drive connections from shaft 45 to the blank separating and feeding mechanisms will be hereinafter described.

The pile of sheet metal blanks from which the sub-blanks for the seaming strips are formed is supported on rails 47, parallel with the direction of the feed and which have inclined extensions 48 leading to the lower level at which the feed already described to the station A occurs and with which cooperate the under surfaces of parallel guide rails 49 mounted over and at right angles to strips 41 and having their ends 50 curving upward and toward the blank magazine to guide blanks fed down said inclines in a manner to be hereinafter stated. The blank magazine is provided with rear vertical wall strips 51 mounted on said rails and with side strips 52 mounted on the table and from which by a cross member 53 in the usual way the front wall strip 54 serrated at 55 in a known manner is supported.

The sucker mechanism employed to separate the lowest blank from the other blanks in the pile being the same as that used to perform a like service for the body blanks will be given the same reference numerals. Details of this construction are shown in Figure 11, to which reference should also be had. Immediately beneath the middle of the pile of blanks is mounted for reciprocation in the bushing or sleeve 56 secured to the under side of the table, a pneumatic sucker whose body 57 is provided with a longitudinal bore 58 connected by tube 59 to suction header 60 (Fig. 1) in which negative pressure is maintained by air pump 61 driven by motor 62 through chain 63. The ends of the bore are normally closed respectively by the feeler valve 64 normally seated by the spring 65 against the bevelled end of bushing 66 screw threaded into the enlarged cavity in which the spring 65 is located and constituting the end of the sucker head and clamping the rubber mouth or washer 67 against the ring 68, the stem of valve 64 fitting the bore of 66 loosely, and at the other end by the valve 69 whose stem is pivotally mounted on arm 70 of a bellcrank fulcrumed at 71 to a bracket on the sucker body 57 and whose other arm 72 carries a cam roll 73 pressed by spring 74 against a cam 75, which, in the case of the sucker associated with the initial feed, is on the shaft 76 driven without speed change by chain 77 from the reduced speed shaft 45. The sucker body is reciprocated from the shaft 76 by eccentric 78 and connections 79 to projection 80 on said body.

The sucker operation is as follows: As the sucker body is moved upward the stem of the feeler valve striking the underside of the lowest blank opens the valve against the pressure of the spring 65, thus permitting atmospheric pressure by virtue of the negative pressure on the under side of the blank to become effective, this condition continuing during the down stroke of the sucker body until the release valve 69 is operated by the cam 75 through the connections described, thus releasing the blank to be fed forward by the initial feed slide which is of usual character having twin slides 81 mounted in slots 82 in the top of the feed table and connected by bolts 83 passing through slots 84 in the table to the horseshoe slide 85 provided with the operating yoke member 86. Each slide 81 has the usual fixed feed finger 87 terminating below the plane of the supporting rails 47 for coaction with the rear edge of the depressed middle portion of the lowest blank. The slide is operated by a cam 88 on the slow motion shaft 45 through connections including a spring yieldable on overstrain and consisting of a bellcrank lever on the transverse rock shaft 89 mounted in brackets 9' at each side of the frame, said lever having on its arm 89' a cam roll 90 and having at the end of its arm 91 a wrist pin 92 gripped by open-ended jaws, one of which, 93, is pivoted at 94 to the other 95 toward which it is forced by spring 96 acting upon nuts 97 on rod 98 connected to the jaw 95. It will be observed that the jaws do not completely encircle the wrist pin which therefore, under overstrain, forces its way forward between them and avoids breakage. The jaws are part of an adjustable link 99 pivotally connected to the yoke member 86. This arrangement of jaws caused by an overstrain release spring to grip a pin is not in itself new, but is employed here in a new combination. Such a construction is called for especially by the manner in which the initial feed must act. While the feed slides 81 operate infrequently as compared with the rapidly reciprocating slide 18, 18', it is necessary, since the blank must be slid by them across the feed dogs without interference with the operation of the slide 18, 18', that the blank be moved very rapidly as it is passing over the dogs. Reference to Figure 3 will show that this is taken care of by the cam 88 which is designed to produce a relatively slow movement of the blank during the first part of the feed followed by a very rapid movement as the blank is slid over the feed dogs. This is effected by the abrupt cam portion 88' which is followed by return portion 88''. Movement of the blank across the feed dogs may be facilitated by bevelling the heads of the feed dogs on the side toward the feed, although they project but very slightly above the surface of the table.

The seaming strip produced at stations A and B is of well known form having at each side a blank-edge-receiving recess. It is made out of a strip of sheet metal $b$, cut from blank $a$, formed at A into the shape $c$ by bending on lines extending lengthwise of the blank into a back portion, side flanges each about half the width of the back portion and free flanges a trifle wider than the side flanges, and modified in shape at B first into the form $d$ and then into the final form $e$ in which the side flanges are doubled against the underside of the back portion and the free flanges project outward from adjacent the center line at corresponding angles with the doubled back leaving at each side a re-entering angular space extending the length of the strip for the reception of the edge of a body blank.

In Figs. 1–4 and 6–10 wherein the mechanism for forming and feeding the seaming strip is shown, cross head 100 carrying the movable station A and B dies, and mounted to slide in upright standards 101 above the table top 19, is suspended by adjustable ball and socket connections 102 from crank shaft 103 driven from shaft 12 by identical spiral gears located in housing 104 and fixed respectively to said shaft and to vertical shaft 105, from which the drive is continued by identical gears 106, 107 on shafts 105 and 103 respectively and both located in housing 108.

Secured to the cross head 100 is the die block 109 having adjustably secured to its front by the fastening bolts 110, with capability of adjustment in the usual way by set screws 111, the die plate 112 having at its lower front corner a shearing edge and by its bottom and inner side cooperating with the bottom and inner side of the die block 109 to produce the female member of the forming dies. Between the inner vertical faces of this die is mounted the stripper 113 pressed outward by springs 114 in cavities 115 in the die block, the outward movement of the stripper being limited by the heads of screw bolts 116 mounted in bores 117 in the die block and through the lower end of which they pass to the stripper into which they are screw threaded. The crosshead also carries the hammer 118 which is located at station B. Mounted on the table at station A for cooperation with the vertically reciprocated die just described are stationary dies supported in a die socket 119 in which is located the die block 120 terminating at its top in the long and narrow male base die 121. In front of the die block 120 is the shear plate 122 whose inner top edge cooperates with the edge of the shear and die plate 112 to sever the sub-blank $b$ from the blank $a$. In rear of the die block 120 is located the guide plate and stop 123 which serves as a guide for the rear face of the die block 109 and against the face of which the front edge of the blank is pushed by the feed slide 18, 18′ and held under the continued pressure of the spring 29 until the sub-blank is severed from the main blank. To enable the feed head 33 of the foremost dog to move forward nearer the dies so as to eliminate waste, the top of the fixed shear plate 122 and the top of the die socket 119 are correspondingly bevelled as indicated at 124. This bevel also permits the scrap to slide down and drop out of the way in front of the feed slide. By the operation of these dies the sub-blank $b$ is formed into the shape $c$ as indicated in Figures 4 and 5.

The next forming operation is performed at station B to which the partially formed strip is fed by mechanism hereinafter described. On the table-top at station B is mounted the stationary die block 125 located in the same plane as the base die at station A. At the top of die block 125 is located male base die which is a long narrow rib of frusto-conical cross section having the upward and inward die inclines 126. At each side of the die block 125 is a side die block 127 mounted to slide on dovetail ribs 128 and carrying side dies 129 whose front surface lies in a plane parallel to that of the adjacent die incline. Springs 130 located in cavities in the side die blocks and in the fixed die block 125 reacting against the latter and against bolts 131 urge the side die blocks outward. With the curved heads of these bolts 131 coact correspondingly curved heads of adjustable wear bolts 132 mounted in rock arms 133 carried in pairs by each of two longitudinal shafts 134. These shafts are mounted in brackets 135 secured to the frame and have at their front ends arms 136 projecting towards each other and whose ends overlap and receive motion from the rod 137 whose lower end is interposed between them and is connected to them both by a pin 138 extending into the slightly elongated slots 139 to provide the necessary lost motion. This rod is mounted for vertical reciprocation in the bracket 140 by cam 141 of crank shaft 103, the upper end of the rod having cam roll 142. The manner in which these dies operate to change the strip from the form $c$ to the intermediate form $d$ and to the final form $e$ will be clear on looking at Figures 6, 7 and 8. The side dies as they are moved toward each other by the rock arms 133 and mechanism just described force the central part of the partially formed strip $c$ up into the position shown in Figure 7, the free flanges being jammed up against the die inclines 126. All that remains to produce the final form of the seaming strip $e$ is the descent of the hammer 118 whose active face is slightly convex transversely leaving room for the edge folds and producing a corresponding slight concavity in the back of the strip. The side dies 129 are held in place until the forming operation has been thus completed.

The means by which the lengthwise feed of the partially formed seaming strip from A to B and of the completed seaming strip from B to C is effected is illustrated in Figures 1, 4 and 6 to 10, the details of the means for projecting and retracting the feed dogs being shown in Figs. 9 and 10. In a bore or cavity 143 extending lengthwise beneath the base dies at stations A and B and located in the central vertical plane of said dies is a feed-dog-carrying slide rod 144 reciprocated from counter-shaft 17 by operative connections as follows: Eccentric 145 having strap 146 pivotally connected to arm 147 of bell-crank lever fulcrumed on transverse shaft 148 whose ends are mounted in the frame at 149, the other arm 150 of the bell crank being connected by overstrain release link 151, whose construction is the same as that of the spring gripped overstrain release jaws 93, 94, 95 heretofore described, to lengthwise rod 152 connected to the rod 144 by the cross head 153. The stationary dies and die base at stations A and B, and the slide rod 144 preferably at intervals, are slotted lengthwise in the central vertical plane of said dies, the slot in the die and die base being indicated by numeral 154 and those in the slide rod by the numeral 155. The purpose of this slot and related construction is to provide simple and reliable means for enabling feed dogs to be carried by the feed slide and to be projected into feeding position for the forward stroke and retracted out of feeding position for the return stroke. In each slot 155 a feed dog 156 is pivotally mounted on a pin 157. The front end of each dog has a feed nose 158 and its rear end a tail enlargement 159. Springs 160 act upon the upper side of said tail to project the feed nose of the dog up through the die and across the feeding plane, i. e. the plane in which lies the top portion of the strip, and at the same time to depress the tail enlargement below the bottom of the slot 155. In order to time this projecting action properly and for the further object of positively retracting the dogs just prior to the return stroke of the feed slide, there is mounted in the portion of the slot 154 below the feed rod 144 and its cavity 143 a feed-dog-controlling strip 161 supported on spaced stationary pins 162 on which its bottom edge may rest or which may support it in a lower position by virtue of notches in said edge spaced to correspond with the pins and having parallel edge surfaces 163 connected with the lower edge of the strip by parallel inclines 164. This strip receives endwise actuation alternately in opposite directions by spaced lugs on the slide rod 144 which conveniently take the form of screw pins 165, 166 projecting downward through and below the open side of a shallow slot 167 designed to receive in the raised position of the strip 161 its lug 168, with opposite sides of which the pins 165, 166 alternately cooperate shortly before the end of the feed and return strokes. Instead of using opposite faces of a single lug, two separate lugs suitably located may be substituted for the lug 168, but the maximum distance between each such lug and the part on the feed dog slide coacting therewith is less than the stroke of the feed slide. Three feed dogs of identical construction spaced apart sufficiently more than the length of the feed strip to give time for projection or retraction as the case may be are individually carried in the several slots 155. In Figure 9 the feed dogs have just been projected into feed position during the last part of the return or leftward stroke of slide rod 144, the feed dog control strip 161 being in its lower position and the feed dog slide rod 144 being about to move to the right to make its feed stroke. As it does so pin 166 moves away from the adjacent side of the lug 168 and pin 165 approaches and finally near the end of the feed stroke comes into contact with the other side of said lug and in the further forward movement of the slide rod pushes the feed-dog-control-strip endwise, causing the inclines 164 to ride up on the pins 162 to raise the strip and bring the lower edge of the strip over said pins which then support it in its raised position. This upward movement forces the tail enlargements 159 of the dogs which are in contact with the top edge of the strip into the slots 155, thereby retracting the feed noses 158 from the line of feed and withdrawing them into slots 154, 155. At the same time the lug 168 is raised into the shallow slot 167 provided to receive it. On the return stroke of the slide rod the feed dogs remain in retracted position and are thus unable to interfere with the seaming strips, but at the close of the return stroke pin 166, by cooperation with the adjacent face of the lug 168, moves the feed-dog-controlling strip 161 to the left until its notches cooperate with the pins 162 and the inclines 164 ride down on them to the lower position of the strip (Fig. 9), the springs 160 acting through the tail enlargements 159 to assist in this operation and at the same time projecting the noses 158 of the dogs out of the slots into feed position. This mechanism in its broader aspects is a feeding means and is useful where a feed having its special characteristics is desired. As combined with other mechanisms of this machine, it is however, of peculiar advantage.

The feed strip has been formed with its double back portion on top and its free flanges at the bottom, and before application to the can body is turned over. This action occurs at station C to which along a suitable way the strip is fed by the feed mechanism just described. The means for reversing the strip and also means for pushing it sidewise into a different line of feed in order that it may be fed forward with the can body blank is shown in Figures 2, 11, 12 and 17 from which it will at once appear that the feed strip has been formed and up to this time fed at a level elevated above the table top. In Figures 11 and 12, the narrow feed ledge 169 at the forward end of the elevated feed way for the strip has a rear vertical wall 170 which forms a guide for one edge of the double back portion of the strip and which is so located with reference to the vertical front wall 171 below the feed ledge 169 as to compel the strip whose top is its heaviest part to be overbalanced outwardly, so that in the absence of other structure it would fall to the table top and turn over in so doing. In order that this action may not occur prematurely and to provide a guide surface and retaining abutment for the front edge of the double back portion, the down-curved plate constituting abutment-trip 172 is provided at station C, being pivotally mounted on removable pin 173 in a standard-carrying block 174 on the table top, this plate having a central rearwardly extending arm 175 and being rocked up and down by operative connections from the upper longitudinal drive shaft 14 as follows: cam 176, cam yoke and roll 177, 178 carried by rod 179, spring pressed toward the cam as shown, and bellcrank 180, 181, fulcrumed on shaft 182 and which by link 183 is connected to arm 175. The automatic reversal of the formed seaming strip would occur with the mechanism thus far described with substantial uniformity on its release by the outward and upward movement of the abutment trip, the strip turning around the lower edge of the free flange resting on the support until the lower edge of the other free flange strikes the face of wall 170 and the strip turns about said edge and falls on its double back. But to preclude any possibility of failure in any individual instance pins 184 spaced apart in the direction of feed are mounted in the vertical front surface 171 in line horizontally a little below the feed ledge 169, so that as the strip falls the re-entering angle between the front part of its double back and the adjacent free flange straddles said pins and insures a correct overturn. It will be observed that the seaming strip is moved to a position in which its side edges are parallel to an edge of the elevated support and in which it is overbalanced on the side toward that edge, so that if permitted to do so it will fall to a lower level turning over sidewise as it does so.

At this point in the machine the line of feed changes and to move the reversed strip crosswise to the new line of feed a pusher plate 185, located beneath the feed ledge 169 is provided, this plate being mounted to slide between the table top and the abutment-trip supporting block 174 which forms a cap for the slide. The angular face 186 of the front edge of said plate which cooperates with the upwardly and outwardly extending free flange of the seaming strip extends a considerable distance lengthwise of the machine in order to re-align the strip accurately and to serve thereafter as a longitudinal guide for the strip during its subsequent endwise feed along a feed way formed by the top of the table, the slide being held stationary in its forward position during said endwise feeding movement for that purpose. This slide is operated from the upper longitudinal shaft 14 by cam 187, cam yoke and roll 188, 189 on rod 190 spring-pressed toward the cam as indicated, bellcrank 191, 192 and link 193 pivotally connected to yoke 194 on the rear end of the slide.

Opposite station C (see Figs. 1, 2 and 11) is located the magazine for the can body blanks f which are ordinarily of fibre-board. In this magazine the pile of blanks is supported from beneath by rails 195 mounted on the table top adjacent the side edges of the blanks, the magazine being provided with side wall strips 196 and also with rear wall strips 197 and with a central front wall strip 198 secured to the horizontal strip 199 running around the magazine, having its rear face serrated at 200 and having a foot 201 extended in the direction of the feed. A back wall member 202 located opposite the front wall strip 198 and having its lower part transversely serrated at 203 is hinged to the supporting wall structure at 204 and is pressed forward against the edges of the adjacent blanks by the spring 205. Separation of the lowest blank from the superposed pile is effected by sucker mechanism identical with that already described and to which the same reference numerals are given. (See Fig. 11.) This sucker, however, reciprocates more rapidly than the other, being indirectly operated from the upper longitudinal drive shaft 14, which, by a chain 206, drives without speed change counter-shaft 207 on which are mounted the cams, etc. already described in connection with the other sucker. This sucker mechanism buckles the blank drawing its middle down below its side edges which are supported by the rails 195, the opposed serrated surfaces 200 and 203, the latter of which is spring pressed forward toward the other, cooperating in preventing more than one blank from being drawn down between them at once. The supporting surface of the rails 195 is above the plane of the table top at which occurs the endwise feed of the reversed seaming strips forward from the station C and the feed of the composite can body forward from the station D after the application of the seaming strip to the can body blank. Inclined rails 208 extending lengthwise at opposite sides of the magazine in prolongation of the rails 195 provide by their top surfaces a feed way down which the side edge portions of the blanks f may be slid in the forward feed. The rail 195 with its extension 208 on the side next the feed way of the seaming strip is supported at the rear with a continuous horizontal slot or space between its under side and the table top extending from the point of support to the forward end of this rail 208, as shown in Figs. 11, 12, 15 and 16ª, and thus provides room for seaming strip feed fingers hereinafter described. The means for accomplishing this feed, both of the can body blank and at the same time of the seaming strip side by side with their adjacent edges in parallel vertical planes, includes twin slides 209, each mounted in a groove 210 on the table top and by bolts 211, extending through slots in the table top as in the case of the feed slide 81 already described, secured to the cross yoke member 212 reciprocated in an opening in the table top, as best shown in Figs. 13 and 15, by operative connections from the shaft 17. These connections may, as illustrated, consist of eccentric 213, its strap 214 pivotally connected to arm 215 of bellcrank fulcrumed on shaft 148 and whose other arm 216 is connected by a link 217 to the forked lug of the cross yoke 212. Adjacent the middle of this slide on its rear end are mounted usual fixed feed fingers 218 symmetrically related to the central longitudinal plane of the feed and adapted to cooperate with the rear edge of the separated blank to feed the same forward underneath the foot 201 of the central front wall strip 198. The rear end of the slide is also provided on the side toward the way for the seaming strips with means for feeding a strip endwise, such means being preferably a fixed feed finger 219 projecting laterally and forward from the slide into and through the space beneath the adjacent rail 195 and into line with which the pusher plate 185 has pushed the reversed seaming strip and which ordinarily has its feed face in line with the feed faces of the feed fingers 218. Mounted in recesses 220 at diametrically opposite points in the twin slides 209 are located feed dogs 221 pivoted on pins 222 and arranged in pairs successively spaced lengthwise of the machine somewhat more than the length of a can body blank, there being four equally spaced pairs of such feed dogs in addition to the feed fingers 218 from which the first pair of such feed dogs is spaced by the same distance. Each of these dogs is pressed up into feed position by a spring 223 and has a feed head having a substantially vertical feed face 224 and a rear incline 225, the height of the feed face being greatest in the rear pair of dogs and being successively less in the dogs in advance thereof until the third set of feed dogs, which operate after the blanks have left the rail inclines and so may be of less height than those which feed blanks while they are on the rail inclines. The rear inclines 225 of the heads of the dogs enable the blanks to depress the dogs out of feed position on the rear stroke. Blank retraction is prevented by a hold-down and hold-back frame having longitudinal members 226 and a cross member 227 connecting the longitudinal members, and hinged at 228 at each side of the front of the magazine. Hold-back dogs 229 are pivoted on pins 230 at diametrically opposite points on the respective longitudinal members 226 so as to form pairs. Each such dog is provided with a stop pin 231 which by contact with the top of the adjacent member 226 limits the downward movement of the front face of the dog which takes in behind the rear edge of each blank fed past it, thus preventing blank retraction on the return of the slide and enabling the blanks to depress the fed dogs 221. No broad novelty is claimed for feed dogs which are spring pressed into active position for the forward feed and are cammed back out of operative position by the blanks on the return stroke.

At the side of the feed slide 209 next the way for the seaming strips further means for feeding the seaming strip endwise supplemental to and cooperating with the endwise feed means already referred to is provided. This means carried by the slide 209 preferably consists of arms 232 extending laterally and forward therefrom into the horizontal slot or space already referred to and which is beneath the adjacent rail extension 208, (see Figs. 15, 16 and 16ª) each arm having mounted thereon a movable trip 233 constituting a feed dog, said dogs and the feed finger 219 being equally spaced lengthwise of the slide a sufficient distance to provide room for the feed strip between feed faces with enough extra space to permit timely movement of the feed dogs into and out of feed position during alternate strokes of the feed slide. In the specific construction illustrated there are two of these arms in addition to the arm 219 having feed faces successively spaced apart the same distance as that between feed faces 224 of successive pairs of dogs 221, and the dogs 233 are pivoted at 234 on the underside of the arms 232 in recesses or portions of reduced thickness at the ends of said arms so that they are carried to and fro by the arms in the space under the adjacent rail 195 and rail extension 208. Each dog 233 has a stop pin 235 for coaction with the opposite ends of a slot 236 in the adjacent part of the end of the arm 232 to limit movement of the dog toward and from feed position. At fixed positions on the frame are provided disappearing dog-operating members arranged as follows. In cavities 237 in the table top spaced apart lengthwise and preferably in line at one side of the line of seaming strip feed and toward slide 209, are located springs 238, each acting on a ball, or other suitably contoured contact 239 retained in the slot but projected by the spring slightly above the table top and into line with the feed dogs 233, so as to turn them around their pivots forward out of, or rearward into, the line of feed of the strips, as the slide moves respectively rearward or forward past a ball, such movement of a feed dog always leaving it in line with the corresponding balls 239. The spring mounting of the balls permits their momentary depression out of the way as the dogs pass over them in both directions, the dogs having their front and rear edges rounded or bevelled slightly to facilitate this action. There are three of these balls, successive balls being spaced apart lengthwise less than the stroke of the feed slide so that two of them are passed over on each stroke by each feed dog 233. In Fig. 16 the feed dog 233 is in feed position having just been carried past the ball 239. On reaching the next ball 239 the dog depresses it remaining in feed position until at the beginning of the return stroke in repassing the latter ball the dog is turned out of line with the strip behind it so as not to interfere with the same. The rearward passage of the dog over the other ball 239 at the end of the rearward stroke does not change the position of the dog, but it is returned to feeding position at the beginning of the next feed stroke. From stations C to D a guide rail 240 extends lengthwise to maintain the seaming strip in proper position during its endwise feed, the adjacent edges of the can body blank and of the strip being in parallel vertical planes. By the means described the lowest can body blank in the can body blank magazine is separated and fed forward along with the seaming strip which lies on its back and presents opposite the edge of the corresponding can body blank a re-entering angular space between the double back portion and the free flange. The feed faces of the can body feed fingers 218 and the strip feeding finger 219 being in line and the feed faces of the can body feed dogs 221 and the seaming strip feed dogs 233 being in line crosswise of the machine, the can body blank and the feed strip are thus maintained in line crosswise of the machine as they are fed at the same time lengthwise thereof step by step from station C to station D. It will be evident that the station C etc. feeds of the blank and strip just described have special adaptation to this machine and are particularly suited to the special purposes for which they are jointly employed therein. They are also, when broadly considered, feed mechanisms and as such useful for performing their functions in other relations.

Referring to Figures 1, 2, 13, 15 and 16, it will be recalled that the function of the mechanism at station D is the application of the seaming strip to the adjacent edge of the can body blank, i. e. the association of the seaming strip and the can body edge in the desired relation with their adjacent edges overlapping and the securing of them together in that relation. In the construction shown this is accomplished by pushing the can body blank crosswise of the machine into the angular space between the front edge of the double back portion and the upwardly and forwardly projecting free flange, which space, as has been noted, is opposed to the adjacent edge of the blank, and fastening said edge in said space by means hereinafter described. At the station D is located a stationary longitudinal guide 241, rabbeted at 242 at its front edge adjacent its bottom to receive the adjacent double portion of the back of the seaming strip and having above the rabbet a projecting portion 243 having its upper face inclined upward and rearward therefrom and fitting the space between the double back portion and the free flange on that side of the strip. The part of the top of the table on which the seaming strip is supported at station D is curved as indicated at 244 to correspond with the curvature of the back of the strip, the curved portion extending on the side toward the body blank to a point below the general table top level. Adjacent this curved portion is located a blank-edge-deflecting incline 245 beneath the can body blank and extending upward and toward the seaming strip and preferably formed on a block 246 parallel with the seaming strip and pressed upward by springs 247 to an extent limited by the heads of bolts 248 which pass up through the bottom of the table into the space in which the springs and block are mounted. The function of this incline is to mask the edge of the seaming strip and to raise the edge of the blank above the double back portion and into alignment with the adjacent angular space of the strip. The bolt heads and the slide are best so related as to prevent the top front edge of the block from rising higher than the level of the top surface of the adjacent doubled back portion but to permit it to rise to said level. In order that the seaming strip may be fed to just the right position and be held therein during the strip-applying operation, there is provided a stop 250 having a vertical stop edge 251 and mounted on the end of a bolt 252 pressed endwise toward the end of the seaming strip by the spring 253, the movement of the bolt being limited by nuts 254. With this stop cooperates a retaining dog 255 pivoted at 256 near the end of the guide rail 240, projecting beyond the face of said guide rail over the strip feedway into the adjacent recess or angular space of the strips fed past it and having its toe pressed downward by the leaf spring 257 onto the adjacent or double back portion of the strip passing under it, thus assisting in keeping the strip in the proper position while it is being fed and, after it has passed, being spring-pressed down onto the feedway immediately behind the strip so as to abut against the rear end of the double back portion of the strip which is held against the retaining dog by action of the spring-pressed bolt 252. By these means the seaming strip is located in readiness for clinching, i. e. firm mechanical securing, to the body blank, its front free flange being directly under the clincher hammer 258 on the slide 259 mounted for vertical reciprocation in the standards 260 by rounded front end 261 of the lever fulcrumed at 262 and to whose rear arm 263 is pivoted vertical operating rod 264 terminating in fork 265 straddling shaft 17 and carrying cam roll 266 operated by cam 267 on said shaft. Before the clinching operation occurs the can body blank is fed crosswise of the machine in which operation the longitudinal member 226 of the hold-down frame adjacent the incline 245 acts to hold the blank against the block 245 and prevent the blank from moving up too far, this member and the incline cooperating to exactly align the front edge of the can body blank with the adjacent angular space in the seaming strip and to guide it thereinto. This crosswise movement of the can body blank is performed by the pusher slide 268 mounted in ways 269 in the top of the table and having at its front edge an upward and forward bevel 270 for properly locating the adjacent edge of the blank and with which cooperates to the same end the adjacent longitudinal member of the hold-back frame 226. The pusher slide 268 has an operating lug extension 271 to which is pivotally connected the upper arm of the lever 272 mounted on stub shaft 273 extending lengthwise of the machine and whose lower arm carries cam roll 274 coacting with cam 275 on the upper longitudinal drive shaft 14. The relative timing of the pusher member and the clincher hammer is such that the can body blank is shoved home into the adjacent angular space in the seaming strip before the hammer blow is delivered and is held there during the quick hammer blow. When the strip has thus been clinched to the adjacent edge of the body blank the next forward feed step occurs and the composite blank is fed forward toward station E. In order that this may be accomplished without interference by the stop 250, its lower rear corner is cut off on an angle as indicated in Fig. 14, thereby permitting the remaining free flange which still projects upward and outward to pass without obstruction.

The mechanism at station E (Figs. 1, 2 and 17–23) forms the composite blank, by which is meant a blank made up of distinct parts or elements, into the required shape and secures its opposite ends together. It includes means for taking up slack in the free end of the can body blank, for preventing improper overlap of the seaming strip by the blank, for guiding the edge of the blank into the adjacent space in the seaming strip and for securing the free edge of the body blank and seaming strip together. The composite blank is fed from station D two more steps in its own plane to station E and is maintained in proper position by guides 276 and 277 at opposite sides of the feed path. At the end of the machine and extending lengthwise centrally thereof is located, in the illustrated structure, a removable squared block 278 mounted in a socket 279 in the table top and from which projects the former horn 280 which has in general the shape which it is desired to give to the finished can body. The top of said horn in the machine illustrated is in the plane of feed of the composite blank. Symmetrically located above said horn, at each side thereof, are identical formers 281 having their inner or former surface shaped to correspond with the adjacent part of the horn and fulcrumed at 282 on the frame. They are operated by mechanism which comprises cams 283, 284, not identical, mounted on the main drive shaft 7 acting on cam rolls 285 on operating rods 286 whose forked ends straddle the shaft and which are provided with telescoping connections 287 applying the pressure through a spring and adapted to yield on overstrain to prevent breakage and to press the ends of the blank against the horn in the forming operation. These rods are pivotally connected at their upper ends to transverse levers 288 fulcrumed at 289 and whose inner ends are connected by links 290 to the formers 281. In order to prevent transverse movement of the end of the arm of the lever 288 to which the rod is connected from being transmitted to the cam roll which is objectionable, a break is preferably provided between said arm and the enlarged part of the corresponding connection 287 which is guided in, and held to endwise movement by a bracket 9″ on the frame. This break is constituted by the end member 287′ of the rod and the short link 287″ pivotally connected to each other and one or both of which may be adjustable. This arrangement duplicated at each side of the machine takes strain off the cam rolls without interfering with the operation of the formers. For purposes of taking up slack, preventing undue overlap, etc., the former horn is provided on the side facing the free end of the can body blank with a movable wing member 291 which is illustrated as provided with end pivots or trunnion pins 292 in line lengthwise of the machine and mounted in corresponding cavities in the horn to permit the wing member to be swung in and out around the axis of said pins its movement in both directions being limited by contact with adjacent parts of the horn as indicated, the top of the wing being shown as inclined to permit the desired range of swing. Power means for periodically moving said wing outward around said axis and holding it temporarily in its outward position until after the adjacent side of the blank has been conformed to it by the spring pressure of the left-hand former is provided as follows: In a cavity 293 extending lengthwise in the former horn in a horizontal plane below that of the pivotal axis of the wing member is located the end of the lever 294 having wing operating lug 295, said lever being fulcrumed on the vertical pin 296, its rear end 297 projecting into a slot in a link 298 extending crosswise of the machine and connected to the upper arm of the lever 299 fulcrumed on the stub shaft 273 and whose lower end carries cam roll 300 held by a spring against cam 301 on the upper longitudinal drive shaft 14. Beneath the former horn 280 is the hammer slide 302 reciprocated in guides 303 by eccentric 304 on the main drive shaft 7 and connecting rod 305. The construction of the hammer itself and related mechanism will be described later on.

The position of the parts before the forming operation begins is shown in Figure 19. The formers 281 then begin to swing down simultaneously as indicated in Figure 18 and continue to act until the body is formed around the horn. Cams 283 and 284 differ as indicated in Fig. 1, cam 284 leading toward the close of the forming stroke so as to cause the right-hand former, i. e. the one adjacent the seaming strip end of the blank, to lead the other and complete the formation on its side before the left-hand former which lags finishes its movement. The seaming strip end of the composite blank is thus the first brought up against the horn, the back of the seaming strip being brought into contact with the bottom of the horn at a point adjacent a longitudinal rib having a shoulder 306 which extends outward beyond the double back of the seaming strip masking the same and which has behind the shoulder a blank-edge-deflecting incline 307 extending outward from the horn and toward the free flange of the seaming strip. It will be observed that the curved lower ends of the formers turn the ends of the blanks inward in the general direction of the seaming strip. At this point in the forming operation the wing member, which has previously been swung out by the action of the lever 294 beyond the normal contour of that side of the horn thus forming a false temporary horn, is still rigidly maintained in its outer position so that the free end of the blank is bent around this false horn contour which is longer than the true horn contour, and is pressed against it by the adjacent spring-pressed former and conformed to it a little before the wing is released for movement to its inward position. The effect of this arrangement is to take up slack in the blank thus tending to align its free end with the recess or angular space of the strip on the other end of the blank and prevent the free end of the blank from passing outside the free flange of the seaming strip and thereby missing the angular space into which it should enter with an edgewise movement. The shoulder 306 and incline 307, on the other hand, are designed to prevent the edge of the free end of the blank from striking the edge of the double back of the seaming strip and, if it should come too near the horn, to guide it out into alignment with the angular space. An additional and cooperating means for preventing the edge of the free end of the blank from missing the angular space and for aligning it therewith, if it should be too far from the horn, may, if desired, be provided in the longitudinal spring pressed stop guide and clamp strip-member 308 mounted opposite the rib on the horn and close beside the clincher hammer 309 and having its end projected a definite distance beyond the end of the hammer as by springs 310 surrounding spaced screw bolts 311 which pass through bores in the hammer 309 and whose heads 312 being located in the cavities 313 act as stops to limit such movement. By its projection in advance of the hammer this member 308, as is clearly indicated in Figure 20, will, when present, further safeguard the free end of the blank against passing beyond, and in the illustrated structure below, the edge of the free flange of the seaming strip and will, if the free end of the blank should be too far from the horn and out of alignment with the angular space or recess in the seaming strip, move it toward the horn into alignment with said angular space. The member 308 has the added function of pressing upon the free end of the blank at a point adjacent its end thereby further guiding it in its edgewise movement into the angular space and holding it against the rib as indicated in Figure 23 when the entire can body has been closely conformed to the true contour of the horn, a movement permitted by the passage of the swell of cam 301 beyond the cam roll 300 which releases the wing-member-operating lever 294 and thereby frees the wing 291 itself for the inward movement which is very quick and occurs just after the free end of the blank has been conformed to the false contour. The member 308 attains the position in which it clamps the free end of the can body blank against the rib shortly before the hammer completes the blow by which it clinches the free flange of the seaming strip against the edge of the free end of the can body blank and thereby completes the can body. In so doing it also strikes the clinched flange of the strip, thus locating the entire strip correctly with reference to the adjacent parts of the finished can body and making adequate clinching of both edges of the strip certain. The hammer is then retracted and the formers swung up to the position shown in Figure 19. After the formers have moved away from the finished can body it is ejected from the horn by identical rods 314 mounted in lugs 315 forming part of the operating yoke 212 of the can body blank and strip feed slide as shown in Figures 13 and 15. These rods project forward from the lugs 315 through bores 316 extending lengthwise of the horn and correspondingly located at the same level near opposite sides of the horn at a point between its top and the wing level. Fixed to each of these rods is an ejector lug 317 movable endwise in a slot 318 extending from each of the bores 316 to the surface of the horn. When the formers have swung out of the way the ejector lugs move forward and force the finished can body from the horn, the relative timing being such that the ejector lugs are moved back in the rearward stroke of the feed slide while the formers are out of line with them, so that no interference occurs.

Starting with the stock to be fashioned into can bodies, in the structure illustrated the metal and fibre blanks, this machine forms sheet metal seaming strips, applies them to can body blanks and forms the composite blank into the finished can body and does this work effectively and with a great saving of time, labor and expense and with the use of a minimum amount of space, and is believed to be the first machine capable of performing and coordinating these various operations to produce these effects.

Particularity in the foregoing specification in describing the machine illustrated is not to be understood as a limitation of the invention to the details specified, but as a measure of simplicity and convenience warranted in view of established principles of patent law. It will be understood that the invention may be variously embodied.

Claims:

1. An organized machine for forming composite can bodies comprising means for forming a sheet metal seaming strip, means for applying the same to a can body blank, and means for forming the composite blank thus produced into the desired can body shape and for thereupon securing the seaming strip to the formed can body blank to complete the can body, said several means being correlated for harmonious operation.

2. A machine for forming composite can bodies comprising dies and die-operating means for forming a seaming strip, and devices for feeding sheet metal blanks thereto, means for associating a can body blank with said seaming strip in overlapped relation, means for securing the seaming strip to the adjacent edge of the can body blank, and means for shaping the composite blank thus formed and for clinching the seaming strip to the free edge of the blank to complete the can body.

3. A machine for forming composite can bodies comprising means for forming a seaming strip, means for feeding the formed strip and a can body blank forward side by side together in different paths in the direction of the length of the strip, and means for associating said strip and blank with their adjacent edges only in overlapping relation and for securing them together.

4. A machine for forming composite can bodies comprising means for forming a seaming strip, a can body blank magazine, means for feeding the strip endwise from the place of its formation to a point opposite said magazine, a companion feed for feeding the strip and a can body blank from the magazine forward side by side together in the direction of the length of the strip, means for associating the strip and blank with an adjacent edge only of each in overlapping relation and means for securing them together thus producing a composite can body blank, and means for shaping the composite blank into can body form with its seaming strip edge and opposite edge together and for securing them together.

5. A machine for forming composite can bodies comprising sheet-metal-blank-shearing and seaming-strip-forming dies, strip reversing means, strip applying mechanism for bringing the body blank and strip into overlapping relation and clinching the strip to the edge of the body blank, means for forming the composite blank thus produced to the can body shape, and hammer devices for thereupon clinching the seaming strip to the opposite edge of the composite blank to complete the can body.

6. A machine for forming composite can bodies comprising coordinated mechanisms located at a series of stations and comprising dies and die-operating means for forming sheet metal seaming strips, strip reversing means, devices for applying the reversed strip to a can body blank, means for forming the composite blank thus produced into can body shape and for clinching the seaming strip to the formed can body, means for presenting to the machine the blanks to be operated upon, and means for effecting the requisite transfers between successive mechanisms.

7. A machine for forming composite can bodies comprising a series of stations located substantially in alignment lengthwise of the machine and at which successive operations are performed, dies and die-operating-means for forming a sheet metal seaming strip, step by step means for feeding it forward to a station down the line, a can body blank magazine at said station, means for feeding a can body blank and a seaming strip side by side down the line from said station, seaming strip and can body blank associating and seaming strip clinching means at one of the stations and can body forming and final seaming strip clinching mechanism at another station further down the line.

8. A machine for forming composite can bodies comprising a series of stations located substantially in alignment lengthwise of the machine and at which successive operations are performed, mechanisms at the first two stations for forming a sheet metal seaming-strip, means for feeding the seaming strip step by step down the line to the third station, a can body magazine at the third station, step by step means for feeding a can body blank from said magazine and a seaming strip side by side further down the line, seaming-strip and can body blank associating and seaming-strip clinching means at the fourth station, and can body forming and final seaming strip clinching mechanism at the fifth station, and coordinated driving means for said mechanisms and feeds.

9. A machine for forming composite can bodies comprising a series of stations located substantially in alignment lengthwise of the machine and at which successive operations are performed, mechanisms at the first two stations for forming a sheet metal seaming-strip, means for feeding the seaming strip step by step down the line to the third station, means for reversing the strip at that station, a can body blank magazine at the third station, means for moving the seaming strip crosswise toward the magazine, step by step means for feeding a can body blank from said magazine and a seaming strip side by side further down the line, seaming strip and can body blank associating and seaming-strip clinching means at the fourth station, can body forming and final seaming strip clinching mechanism at the fifth station, and co-ordinated driving means for said mechanisms and feeds.

10. A machine for forming composite can bodies comprising a series of stations located substantially in alignment lengthwise of the machine and at which successive operations are performed, a sheet metal blank magazine at one side of said line adjacent the first station, and a can body blank magazine on the other side of said line at a station down the line, means for feeding blanks from said first magazine, and devices for forming them into seaming strips, step by step feed means for transferring the formed strips individually to the station at which the other magazine is located, and means for feeding a body blank from the body blank magazine side by side with the seaming strip down the line for manufacture into a can body at the remaining stations.

11. A machine for forming composite can bodies comprising a series of stations at which are performed by coordinated mechanisms successive operations including sheet metal blank shearing and seaming-strip forming, seaming-strip reversing, and seaming-strip to body blank applying, composite blank forming into can body shape and final strip clinching, a sheet metal blank magazine, blank separating means, a feed slide for receiving and conveying the separated blank, a feed slide receiving the blank from the first feed slide and delivering it to the first station, a can body blank magazine, means for feeding the seaming strip to a point opposite the body blank magazine, means for separating a blank therefrom, and a feed slide for moving it and the seaming strip forward together to the remaining stations.

12. A machine for forming composite can bodies comprising means for forming and feeding a seaming strip on one plane, devices for dropping it to a lower plane and thereby reversing it, means for feeding it forward endwise on said lower plane, means for feeding a body blank to said lower plane and forward in said lower plane side by side with the seaming strip, mechanism for overlapping said strip and body blank and for clinching the strip to one edge of the blank, means for forming said composite blank into can body shape and for clinching the free edge of the seaming strip to the free edge of the can body.

13. In a machine for forming composite can bodies, means for forming a seaming strip at one level in one position, means for dropping it from said level into a different position on another level, means for aligning it in a plane parallel to the plane normal to a can body blank and passing through the adjacent edge of the blank and for locating it in the line of feed, a companion feed for the body blank and the seaming strip moving them forward step by step together in the relation stated, means for overlapping their adjacent edges and for thereupon fixing them in that relative position, and means for completing the can body.

14. A machine for forming composite can bodies, comprising means for forming a seaming strip with a back of double thickness uppermost and with free edge flanges extending downward and outward from the underside of the back, strip reversing means, can body blank and seaming strip associating and strip securing means, a former horn and associated mechanism for shaping the composite can body blank into can shape and for fastening its opposite edges together, transfer means for carrying the blanks and seaming strip through the machine, and power means for driving the several mechanisms in due coordination.

15. A machine for forming composite can bodies comprising sheet-metal-blank-shearing and seaming-strip-forming dies, strip reversing means, strip applying mechanism for locating an edge of the body blank between overlapping parts of the strip and for clinching said parts on said edge, means for forming the composite blank thus produced to the can body shape, and hammer devices for thereupon clinching the opposite edge of the seaming strip to the opposite edge of the composite blank to complete the can body.

16. A machine for forming composite can bodies comprising dies and die-operating means for forming a sheet metal seaming strip with a doubled back and free flanges projecting outward and laterally from adjacent the central line thereof to constitute re-entrant angular spaces at opposite sides thereof, means for giving a can body blank and said seaming strip relative movement into overlapping relation with a can body edge in the adjacent re-entrant angular space between said doubled back and one of the free flanges, a hammer for thereupon clinching the flange onto said edge, a former horn, formers for shaping the composite can body blank to said horn with the free edge of the blank in the other re-entrant angular space, and a reciprocating hammer for clinching the free flange of the seaming strip to the free edge of the can body blank to finish the can body.

17. A machine for forming composite can bodies comprising dies and die-operating means for forming from a sheet metal blank a seaming strip having on top a double back portion and free flanges projecting downward and outward from adjacent the center line of the strip on its underside, a support for the strip below the plane in which the strip is formed, strip reversing means locating it on its back on said support with its free flanges extending upward and outward, mechanism for associating a can body blank with said reversed seaming strip with one of its edges in the angular space between said double back portion and the adjacent free flange, and means for clinching the free flange on said edge, composite can body forming mechanism to shape the composite blank into the desired form, and means for clinching the other free flange of the seaming strip upon the opposite edge of the blank to complete the can body.

18. A machine for forming composite can bodies comprising coordinated mechanisms, with associated feeds, for performing various operations, including means for shearing a strip from a sheet metal blank, means for forming said strip into a seaming-strip having a double back and free flanges projecting outwardly and laterally from adjacent the center line thereof to form at opposite sides thereof re-entrant angular spaces extending lengthwise of the strip, strip-reversing devices, mechanism for associating a can body blank and seaming-strip with an edge of the blank in one of said re-entrant angular spaces, seaming-strip applying means, and composite can body forming means, and final strip clinching means to complete the can body.

19. A machine for forming composite can bodies comprising in combination means for associating, a seaming strip and a can body blank and for securing the strip to the edge of the can body blank, and means for forming into can body shape the composite can body blank thus produced and for securing its seaming strip edge and its opposite free edge together, these means being located at successive stations and being duly coordinated for harmonious operation, and transfer means for feeding the composite blank from the station at which it is produced to the station at which it is formed into the finished can body.

20. In a machine for forming composite can bodies, feed ways for can body blanks and seaming strips located side by side, a feed slide having transversely spaced means for feeding the corresponding body blank and strip forward together at the same time, means for producing relative movement of said blank and strip crosswise of the line of feed into transversely overlapping relation, devices for securing the strip to the blank, and can body forming means bringing into juxtaposition the seaming strip edge and the opposite edge of the composite blank and securing them together.

21. In a machine for forming composite can bodies, feed ways for can body blanks and seaming strips extending in the same direction and spaced apart transversely, guide means extending lengthwise adjacent the way for the seaming strip, strip-clinching mechanism adjacent the way for the seaming strip, a feed slide having a longitudinally spaced series of transversely aligned feed dogs for the body blanks and seaming strips respectively, means for reciprocating said slide in the direction of the length of the strip to feed the body blanks and strips forward step by step together in pairs to said strip-clinching mechanism, and means for relatively moving the body blank and strip of the pair adjacent the strip-clinching mechanism into overlapping relation prior to clinching.

22. In a machine of the class described, a feed dog support, a fore and aft series of feed dogs movably mounted thereon having their bodies arranged side by side and overlapped and their heads in line, and means for reciprocating said support.

23. In a machine of the class described, a feed slide, a series of movable feed dogs mounted thereon successively from front to rear of the slide, successive dogs having their bodies in parallel vertical planes and their heads extending alternately in opposite directions from one such plane into the other.

24. In a machine of the class described, a feed slide for blanks, a series of feed dogs pivoted thereon succesively from front to rear of the slide, each having its head extending across and located symmetrically with respect to the central longitudinal plane normal to the feed path of the blank, the bodies of odd numbered dogs being in one plane and the bodies of even numbered dogs being in an adjacent parallel plane.

25. In a machine of the class described, a feed slide having supported thereon a series of pivoted feed dogs having their bodies located in adjacent parallel vertical planes and their heads in line from front to rear, alternate feed dogs having their bodies overlapped and their heads extending crosswise in opposite directions over the bodies of the adjacent dogs.

26. In a machine of the class described, a feed slide reciprocable endwise and having mounted thereon a fore and aft series of movable feed dogs whose feed faces are spaced apart less than a dog length.

27. In a machine of the class described, a feed slide, a number of feed dogs symmetrically arranged with respect to a fore and aft rear plane through the slide, whose bodies overlap and whose combined length exceeds that of the slide, and means for reciprocating said slide to effect a step by step feed.

28. In a machine of the class described, a reciprocating slide provided from front to rear with two parallel adjacent series of recesses each in staggered relation to the adjacent recess of the other series, a feed dog pivoted in each recess and having its head projecting into the opposed recess, a spring for projecting the head of each dog into the plane of feed, and stop means for limiting such projection, whereby the heads of those dogs which are beneath the blank are depressed below the plane of feed.

29. In a machine of the class described, a feed slide comprising two distinct pre-assembled units each having space open at one side and a fore and aft series of feed dogs movably mounted therein and having heads projecting through the open side and means for securing said pre-assembled units to the rest of the slide with their open sides juxtaposed and the dog heads of each projecting into the other.

30. In a machine of the class described, a feed slide comprising two distinct pre-assembled units each being a supporting member having a fore and aft series of cavities in each of which is movably mounted a feed dog with its head projecting beyond the adjacent face of its supporting member, and means for securing said pre-assembled units to the rest of the slide side by side to locate the dogs in a fore and aft series with heads in line and bodies in parallel planes.

31. In a machine of the class described, a feed slide comprising two distinct pre-assembled units each being a supporting member having a front to rear series of open topped and open sided cavities in each of which is movably mounted a feed dog, and means for securing said pre-assembled units to the rest of the slide adjacent a common vertical plane and with the adjacent cavities of the opposed units staggered but open to each other.

32. In a machine of the class described, blank severing and forming dies and means for operating the same, a stop for the blank adjacent said dies, a feed slide, a series of feed dogs spaced apart from front to rear movably mounted thereon, means for reciprocating the slide to feed the blank and blank remainders successively to said dies and against said stop, said means including a spring adapted to yield at the end of each feed stroke to yieldingly hold the blank and each successive blank remainder against said stop during severing of the sub-blank.

33. In a machine of the class described, a feed slide for blanks, a stop for blanks, means for reciprocating said slide endwise to move the blank against the stop comprising a power shaft and operative connections therefrom to the slide including a spring put under compression at the end of each feed stroke to yieldingly press the blank against the stop.

34. In a machine of the class described, blank cutting up and forming dies, means for operating said dies, a feed-dog-supporting slide and operative connections to reciprocate it toward and from said dies in coordination with the die operating means, and a series of feed dogs movably mounted on said slide and whose combined length exceeds that of the slide, said dogs being equal in number to the number of sub-blanks to be cut from the main blank and arranged in line from front to rear of the slide, adjacent dogs having their feed faces in symmetrical relation to the central vertical plane thereof and spaced apart substantially the width of the sub-blanks.

35. In a machine of the class described, blank cutting up and forming dies and die operating means, a feed-dog-supporting slide and operative connections to reciprocate it toward and from said dies, a series of feed dogs movably mounted on said feed dog slide equal in number to the number of sub-blanks to be cut from the main blank and arranged in line from front to rear of the slide adjacent the central vertical plane of the feed path of the blank to the forming dies and having the feed faces of adjacent dogs spaced apart substantially the width of the sub-blanks, a blank magazine located at one side of the feed dog slide, supporting rails under the pile of blanks adjacent its opposite edges and extending crosswise of the path of the said feed slide, a feed slide under said magazine, and means for reciprocating this feed slide to deliver the lowest blank to the first feed slide, said means including a quick action cam for giving a sudden reciprocation to deliver the blank without interference with the operation of the first feed slide.

36. In a machine of the class described, a magazine for blanks, feed rails adjacent opposite sides of the pile of blanks and on which the pile rests, said rails having inclined extensions leading from the plane of their blank supporting surface to a lower plane, a feed slide having feed fingers for cooperation with the lowest blank when its middle portion is separated from the rest of the pile, means for buckling said blank to effect said separation and place the buckled portion in the path of said feed fingers, and means relatively timed with respect to the operation of the buckling means to actuate said feed slide to feed the blank down the inclines to the lower feed level.

37. In a machine of the class described, a feed dog support, a fore and aft series of feed dogs movably mounted thereon having their bodies arranged side by side and overlapped and their heads in line from front to rear, and means for reciprocating said support.

38. In a machine of the class described, a feed-dog support, a fore and aft series of feed dogs movably mounted thereon having their bodies arranged side by side and overlapped and their heads out of line crosswise of the support, and means for reciprocating said support.

39. In a machine of the class described, a feed dog support, a fore and aft series of successively acting feed dogs movably mounted thereon in overlapping relation, and means for reciprocating said support.

40. In a machine of the class described a feed dog support, a fore and aft series of feed dogs thereon, and means for reciprocating said support at a rapid rate, another feed slide reciprocated at a much slower but coordinated rate located adjacent said feed slide and having a path transverse to that of the first feed slide and adapted to deliver blanks thereto, and means, adapted to yield only on overstrain, for giving the second feed slide a sudden rapid movement to feed the blank past the feed dogs.

41. In a machine of the class described, blank forming means comprising a die base and a reciprocating die head opposed thereto, a pair of dies supported respectively by said die base and die head, an endwise slidable feed rod mounted in said base in the plane of the dies, a feed dog movably mounted on said feed rod, means for reciprocating the feed rod endwise, and means actuated by the reciprocation of the feed rod for causing the feed dog to be projected into and retracted out of the plane of the blank at the end of alternate strokes of the rod.

42. In a machine of the class described, a pair of cooperating seaming-strip forming dies including a base die centrally slotted lengthwise, a feed dog, means for moving it lengthwise of the base die in the slot to feed formed strip endwise therefrom, and means actuated by said lengthwise movement in one direction to project the dog through said slot into feeding position and by said movement in the other direction to retract it therein to clear the strip for the return movement.

43. In a machine of the class described, a pair of cooperating strip forming dies including a base die centrally slotted lengthwise, spaced feed dogs movable lengthwise of the base die in the slot to feed formed strip endwise from the base die, means for giving the dogs such lengthwise movement, and means for moving the dogs out of the slot to feed position and into the slot out of feed position.

44. In a machine of the class described, a pair of cooperating strip-forming dies including a base die centrally slotted lengthwise, a feed dog support mounted beneath said dies for reciprocation lengthwise thereof, aligned feed dogs movably mounted on said support opposite the slot and spaced apart in the direction of the feed at least the length of the strip, spring means for urging said dogs through said slot into the plane of the strip for feeding but permitting their retraction for the return stroke, and means for effecting such retraction.

45. In a machine of the class described, a pair of cooperating strip forming dies including a base die slotted lengthwise, feed dogs movable in said slots lengthwise, of the base die to feed formed strip endwise from the dies, a support for said dogs on which they are mounted in line and spaced apart in the direction of the feed more than the length of the strip, means for reciprocating said support lengthwise of the dies, and means brought into operation by said lengthwise movement to project the dogs through said slot into feeding position and to retract them therein to clear the strip for the return movement.

46. In a machine of the class described, strip forming means comprising a die and a reciprocating die head carrying a second die located in the same plane as the first and coacting therewith, said first die being centrally slotted, a feed rod slidably mounted beyond said dies, adjacent said first die and in the said plane, feed dogs movably mounted on said rod, and a dog-operating slide reciprocated at intervals alternately in opposite directions by reciprocation of the rod for causing said dogs to be projected through said slot into line with the strip on one stroke and to be retracted on the next.

47. In a machine of the class described, a base die slotted lengthwise, a feed dog carrying slide, means for reciprocating said slide, a series of feed dogs movably mounted on said slide in line lengthwise of the slot, a feed dog operating member adjacent the feed dog carrying slide, cooperating lugs on said slides arranged in pairs, the maximum separation of each lug on one slide from the corresponding lug on the other being less than the length of the stroke of the feed slide.

48. In a machine of the class described, a die, a reciprocating die head carrying a die located in the same plane as the first die and cooperating therewith, a feed rod mounted in said plane below said first die and movable endwise, said die and feed rod being centrally slotted, feed dogs carried movably in its slotted part by the feed rod, a feed-dog-operating member movably mounted in an extension of said slot, and means carried by the feed rod for moving the feed-dog-operating member endwise, means cooperating with the feed-dog-operating member for moving it in the slot toward and from the feed dogs to cause the same to be projected or retracted through the open side of the slot according to the direction of the movement of said member.

49. In a machine of the class described, a feed slide, spaced feed dogs movably mounted thereon, means for reciprocating the slide endwise, a second slide adjacent the first and having lost motion operative connection therewith to be carried with the first slide alternately in opposite directions, cam means on said second slide and on the frame for shifting the second slide to and fro in a direction other than that of its reciprocation to insure feed dog projection and retraction into and out of feed position.

50. In a machine of the class described, a fixed seaming-strip die and a cooperating movable die, an endwise slidable feed-dog-support adjacent the fixed die, the fixed die being centrally slotted lengthwise, feed dogs mounted on the feed dog support in the plane of said slot, means for reciprocating said feed-dog-support in the direction of the length of the slot, a feed-dog-operating member, actuating means for said member comprising cooperating parts on the frame and member respectively, one of which has the character of a cam, and lost motion operative connections between the feed-dog-support and said feed-dog-operating member for shifting said member at intervals alternately in opposite directions and thereby projecting the feed dogs through the slot in the die into the plane of feed and retracting them out of said plane.

51. In a machine of the class described, a reciprocating die, a base die cleft by a central slot, a feed-dog-support adjacent said base die, spaced feed dogs movably mounted thereon for endwise travel in the slot in feeding, means for reciprocating said support in the direction of the length of the slot, and a feed-dog-operating slide located in said slot and having means in the path of part of the feed-dog-support for contact and shifting therewith endwise alternately in opposite directions, and means for shifting the thus actuated feed-dog-operating slide alternately toward and from the mouth of the slot to cause the retraction or projection of the feed dogs.

52. In a machine of the class described, a fixed die, a movable die in the plane of and cooperating with the fixed die, said fixed die having beneath it an elongated cavity, a feed rod movable endwise therein, said fixed die being centrally slotted lengthwise, the slot extending into the supporting structure below the feed rod cavity and said feed rod having slot space in the central plane of the fixed die, spaced feed dogs movably supported edgewise in the slot space of the feed rod and whose opposite ends are projectable beyond opposite sides of said rod, spring means for projecting their feed ends from the die slot, a feed-dog-operating strip mounted edgewise in the part of the slot beyond the feed rod, fixed cross pins in this part of the slot, cam inclines cooperating respectively with said pins, lugs on said feed rod and feed-dog-operating strip arranged for cooperation in pairs at ends of successive strokes of the feed rod to move said operating strip endwise alternately in opposite directions and thereby ride the cam inclines up or down according to the direction of the feed rod movement to actuate said dogs against the action of the spring or permit their movement by the spring action.

53. In a machine of the class described, means for forming and feeding a seaming strip comprising a die base and a reciprocating die head, said base and head being provided with two cooperating sets of long narrow seaming-strip dies arranged successively in line lengthwise and of the same length, the fixed dies being centrally slotted lengthwise, a feed-dog-carrying slide mounted in said base below the fixed dies, three feed dogs pivotally supported on said slide at equal intervals somewhat in excess of the length of the dies and in the plane of the slot, a feed-dog-operating slide mounted adjacent the feed dog-carrying-slide, means on the base and feed-dog-operating slide to cause said slide to move respectively toward and from the feed dogs when given endwise movement in opposite directions, and lost motion connections between the feed-dog-slide and the feed-dog-operating slide operative at the ends of opposite strokes of the reciprocating feed-dog-carrying slide to carry the two slides forward or backward together thereby causing the movement of the feed-dog-operating slide toward and from the feed dogs, said dogs having parts in the path of the feed-dog-operating slide so as to be projected thereby out of said slot into strip feeding position or withdrawn therefrom.

54. In a machine of the class described, blank forming means comprising an upstanding central rib die of conical cross-section centrally slotted lengthwise, a pair of side dies whose respective front end faces correspond to the adjacent sides of the rib, and means for actuating said side dies, a feed dog support below the dies, a feed dog movably mounted on said support, and means for reciprocating said support lengthwise of said rib die and for projecting and retracting said feed dog in said slot into and out of the plane of the feed.

55. In a machine of the class described, a set of cooperating dies including a stationary die base, a reciprocating die head for cooperation therewith and movable side die blocks at each side of the fixed die, each side die block having a spring-receiving bore closed at the outer end by a headed wear bolt, opposed bell cranks at opposite sides of the stationary die, headed adjustable wear bolts in the upstanding arm of each bell crank opposed to the wear bolt closes, and means for simultaneously operating said bell cranks to actuate the side blocks.

56. In a machine of the class described, an elevated support for a seaming strip, means for feeding a seaming strip to a position thereon in which it is overbalanced outward, and another support for the seaming strip below the first and to which it falls therefrom reversing itself in so doing.

57. In a machine of the class described, dies and die operating means for forming a seaming strip at one level, releasable means for retaining the strip at the level on which it was formed, and means for releasing the retaining means to permit the strip to fall to a lower level whereby it is reversed.

58. In a machine of the class described, means for forming a sheet metal seaming-strip, an elevated support therefor, means for feeding said strip to said support into a position in which it projects out beyond the edge of the support and is overbalanced outward, a pivoted abutment strip for retaining the strip on said support, means for swinging the abutment trip around its pivot to release the strip, whereupon it falls to a lower level and is reversed in so doing.

59. In a machine of the class described, a narrow elevated supporting ledge having a back wall, means for feeding a seaming strip endwise along said ledge while overbalanced outward, and an abutment strip preventing its fall and acting as a guide for its front edge, the back wall of the ledge acting as a guide for its rear edge, and means for removing said trip to release said strip and permit its fall to a lower level.

60. In a machine of the class described, means for forming a seaming strip at one level in one position, means for dropping it from said level into a different position on another level, means for supporting a can body blank adjacent the point where the dropping occurs, and means for re-aligning the seaming strip on the lower level in a plane parallel to the plane normal to a can body blank on said supporting means and passing through the adjacent edge of the blank.

61. In a machine of the class described, means for forming a sheet metal seaming-strip on a level elevated above the table top, a feed way for the strip also elevated and extending from the place of formation of the strip in the direction of its length and terminating in a narrow portion longer than the strip, means for feeding the strip endwise along said way to said narrow portion, and releasable means for guiding the strip in its endwise movement and for retaining it overbalanced outward on said narrow portion whereby the strip on the release of said retaining means is reversed as it falls to a lower level.

62. In a machine of the class described, dies and die operating means for forming a seaming strip at one level, means for feeding the strip endwise from the forming dies, releasable means for retaining the strip at the level on which it was formed, means for releasing the retaining means to permit the strip to fall to a lower level, and means for controlling the fall of the strip to insure its reversal.

63. In a machine of the class described, an elevated support for a sheet metal seaming strip having a back of double thickness and free flanges diverging downward and outward from adjacent its centre line, and means for feeding the strip to a position in which it rests on the edge of the inner only of said free flanges and is overbalanced outward beyond the edge of the elevated support for reversal on falling.

64. In a machine of the class described, an elevated support, means for retaining thereon a sheet metal seaming strip, means for removing the retaining means and dropping the strip to a lower feed level whereby it is reversed, a cross feed slide beneath said elevated support at the lower feed level having its feed face adapted to the adjacent side of the strip and means for reciprocating said slide to move the reversed strip crosswise to a different line of feed.

65. In a machine of the class described, an elevated support, means for retaining thereon in a position in which it is overbalanced outward a sheet metal seaming strip, means for removing said retaining means to permit the strip to fall to a lower feed level whereby it is reversed, a cross feed slide beneath said elevated support at the lower feed level having its feed face adapted to the adjacent side of the strip, means for reciprocating said slide to realign the reversed strip and move it crosswise to a different line of feed, and means for feeding forward together step by step in the direction of the length of the strip a can body blank and said strip side by side.

66. In a machine of the class described in which are to be incorporated seaming strips having a double back and free flanges extending lengthwise of the strip and projecting from the strip from adjacent the center line thereof to form an angular space along each side thereof, an elevated support for such a seaming strip having a substantially vertical front face below its supporting surface, means for releasably retaining said strip on said support with its back on top and its center of gravity beyond said front face, correspondingly located pins spaced apart in the direction of the length of the support and projecting outward from said face to be received in the adjacent angular space to compel the reversal of a seaming strip falling from said support.

67. In a machine of the class described, means for forming a sheet metal-seaming strip having a double back and free flanges extending lengthwise of the strip and projecting downward and outward from the under side of the strip from adjacent the center line thereof, an elevated supporting ledge in line endwise with the strip forming mechanism and narrower than the seaming strip, means for feeding the formed strip endwise to said elevated supporting ledge with the edge of one of its divergent free flanges resting thereon and the other free flange projecting beyond the front face of said support, a removable longitudinal guide for the outer edge of the double portion of the seaming strip, and means for withdrawing said guide to permit the strip to be dropped to a lower feed level, in which operation it reverses itself so as to rest on its back with its divergent flanges projecting upward.

68. In a machine of the class described, means for forming a sheet metal seaming strip having a double back and free flanges extending lengthwise of the strip and projecting downward and outward from the under side of the strip from adjacent the center line thereof, an elevated supporting ledge for said strip so narrow as to throw the center of gravity of a seaming strip thereon outside of the front edge of said support, the inner doubled edge of the strip being in contact with the wall of said supporting ledge, means for feeding the formed blank to said supporting ledge with one of its divergent free flanges resting thereon and the other projecting beyond the front edge of said support, a retaining and releasing abutment trip having an abutting surface against which the outer doubled edge of the strip rests, means projecting from the front face of the support below the supporting ledge to receive the angle between the outwardly projecting free flange and the doubled part of the strip adjacent thereto when on the removal of the trip the strip falls and is reversed, such projecting means making certain the operation, and means for withdrawing the trip to permit such fall and reversal.

69. In a machine of the class described, a blank magazine having means for supporting a superposed pile of blanks, said magazine having a front wall plate serrated on its rear side and a rear wall plate serrated on its front side and provided with spring means for moving it forward, supporting rails beneath said blanks, means for separating the middle portions of the lowest blank from the rest of the blanks, said serrated wall plates assisting in the separation, and means for feeding the lowest blank forward along said rails with its middle part below the front plate.

70. In a machine of the class described, a blank magazine having means for supporting a superposed pile of blanks, said magazine having a front wall member serrated on its rear side and a rear wall member having pivoted thereto on a transverse axis a plate serrated on its front side and extending downward from said axis, spring means for swinging said plate forward around said axis, supporting rails beneath said blanks, means for separating the middle of the lowest blank from the rest of the blanks, said serrated wall members assisting in the separation, and means for feeding the lowest blank forward along said rails with its middle part below the front plate.

71. In a machine of the class described, a magazine adapted to contain a pile of superposed blanks and having supporting rails beneath said pile and adjacent opposite side edges of the blanks, a feed slide having feed means designed to act on the blanks at one level and other feed means adapted to act on them at various levels, said rails having inclined extensions to a lower feed plane, and means for drawing down the middle portion of the lowest blank in the magazine into range of the feed means first referred to, the other feed means specified acting thereafter to feed forward blanks which have been freed from the magazine and fed forward till they rest on the inclines and to feed forward also blanks located in the lower feed plane.

72. In a machine of the class described, a magazine adapted to contain a pile of superposed blanks and having supporting rails beneath said pile and adjacent opposite side edges of the blanks, a feed slide having feed means designed to act on the blanks at one level and other feed means adapted to act on them at various levels, said rails having inclined extensions to a lower feed plane, means for drawing down the middle portion of the lowest blank in the magazine into range of the feed means first referred to, the other feed means specified acting thereafter to feed forward blanks which have been freed from the magazine and fed forward till they rest on the inclines and to feed forward also blanks located in the lower feed plane, and a retarding frame resting on the blanks on the inclines and at the lower level and having thereon corresponding pairs of equally spaced dogs adapted to fall in behind blanks fed past them to prevent blank retraction on the return of the feed slide.

73. In a machine of the class described, a blank magazine, a feed slide below the same, means for reciprocating it lengthwise to feed blanks from the magazine, and a hold-back frame pivoted adjacent the front of the magazine and capable of being turned up out of the way and having a series of equally spaced dogs free to rise as the respective blanks are fed under them and to fall into place in rear of said blanks when they have been fed past to prevent blank retraction on the return stroke of the feeding slide.

74. In a machine of the class described, a blank magazine, a feed slide mounted for endwise reciprocation beneath said magazine, blank supporting means under the pile of blanks in the magazine, blank supporting means in a lower plane at a distance in advance of the magazine, and feed inclines interposed between said planes, means for separating the middle portion of the lowest blank from the pile, feed fingers at the rear of the slide for cooperating with the rear edge of the depressed portion of the lowest blank to feed the blank forward, additional feed dogs on said feed slide correspondingly spaced and projecting up past the lower feed level successively lesser distances as their location is further from the rear end of the feed slide to cooperate with the rear edges of blanks at different heights on said inclines and on the lower feed plane, and means for reciprocating the feed slide.

75. In a machine for forming composite can bodies, a can body blank magazine, a feed way for a seaming strip at one side thereof, a feed slide having feed fingers for cooperation with a blank in said magazine and having also a feed finger projecting at one side thereof into line with a sheet metal seaming strip on said feed way, the feed faces of said feed fingers being substantially in line transversely, and means for reciprocating the feed slide to feed forward together the body blank and the seaming strip.

76. In a machine of the class described, a feed slide, means for reciprocating said slide, a feed dog movably mounted thereon and adapted to form a lateral extension thereof into a line of feed during the feed movement, and means on the frame into contact with which said dog is brought on the return stroke of the slide and by which it is moved out of the line of feed.

77. In a machine of the class described, a feed slide, means for reciprocating the feed slide, a feed dog mounted thereon for limited movement transverse thereto and adapted to form a lateral extension thereof into an adjacent line of feed during the feed movement, and spring pressed means in the path of the dog both on the forward and on the return stroke adapted to move the dog transversely into or out of the line of feed and to be thereafter forced by the dog out of its way.

78. In a machine of the class described, a feed slide, a feed dog movably mounted thereon for movement into and out of a parallel line of feed at one side of the slide, a spring pressed member in a fixed location on the frame projecting crosswise of the plane of the dog into the path of the dog, a lost motion and stop connection between said dog and slide preventing movement of the feed face of the dog rearward beyond its feed position, but permitting movement forward therefrom out of the line of feed, and means for reciprocating the feed slide.

79. In a machine of the class described, a feed slide, a feed dog movably mounted thereon for movement into and out of a parallel line of feed at one side of the slide, a spring pressed member in a fixed location on the frame projecting into the path of the dog, a slot and pin connection between said dog and slide permitting movement of the dog by said member into and out of said line of feed but preventing movement of the dog out of line with said member in either direction of slide movement.

80. In a machine of the class described, a feed slide having a laterally projecting feed finger, a feed dog pivoted on said finger and adapted to form an extension thereof into a line of feed during the feed movement, and disappearing means in fixed location on the frame between the slide and said line of feed spring pressed into the path of the dog adapted to displace the dog from the line of feed on the return stroke of the slide and to replace it therein on the feed stroke.

81. In a machine of the class described, a feed slide having a laterally projecting arm, means for reciprocating said slide, a feed dog pivoted on the arm and projecting laterally beyond the end of the arm into a line of feed to form during feeding an extension thereof, said dog and arm having a stop pin and cooperating slot connection, and disappearing spring-pressed means on the frame located beyond the line in which the pivot of the dog reciprocates adapted to swing the dog into the line of feed and to be suppressed by the dog in the forward or feeding movement and to swing the dog about its pivot out of the line of feed on the return stroke of the slide, the swinging movement of the dog in each direction being limited by the pin and slot connection to a range which maintains it always in line with the disappearing means.

82. In a machine for forming composite can bodies, a magazine for can body blanks, rails underneath the pile of blanks for supporting the same having forward downwardly inclined extensions forming a feed way for the can body blanks, means for separating the lowest blank from the rest and for feeding it down said way, a way for a seaming strip parallel with the direction of can body blank feed and at a level lower than that of the surface of the rails within the magazine, space being provided under the adjacent rail and extension at that level, and means associated with the can body blank feed and projecting therefrom into said space for feeding the body blank and the seaming strip forward together side by side and ultimately on the same level.

83. In a machine for forming composite can bodies, a table top providing a feed way for seaming strips, a magazine for can body blanks, means at each side of the magazine for supporting the pile of blanks above the level of the table top, inclines extending downward and forward from the magazine in a direction parallel to that of the way for the seaming strips and forming a feed way for the can body blanks, the supporting means and the incline on the side next the way for the seaming strips having their underside spaced from the table top, a feed slide having longitudinally spaced means for feeding blanks from the magazine down the way for the blanks and having corresponding feed fingers projecting laterally into the space under said supporting means and incline into the line of feed of the seaming strip to feed can body blanks and seaming strips forward side by side in pairs ultimately on the table top level, and means for reciprocating said slide.

84. In a machine for forming composite can bodies, a table top providing a feed way for seaming strips, a magazine for can body blanks, means at each side of the magazine for supporting the pile of blanks above the level of the table top, inclines extending downward and forward from the magazine in a direction parallel to that of the way for the seaming strips and forming a feed way for the can body blanks, the supporting means and the incline on the side next the way for the seaming strips having their underside spaced from the table top, a feed slide having longitudinally spaced means for feeding blanks from the magazine down the way for the blanks and having corresponding feed fingers projecting laterally into the space under said supporting means and incline, feed dogs mounted for limited movement on the ends of said feed fingers except the rearmost, and disappearing spring pressed members in fixed location on the frame in the path of said feed dogs and spaced apart less than the stroke of the slide to move said dogs into and out of line with the seaming strips on feed and return strokes, to feed can body blanks and seaming strips forward side by side in pairs, the former down the inclines to the table top and then along it and the latter along the table top.

85. In a machine for forming composite can bodies, a feed slide having longitudinally spaced means for feeding can body blanks, feed dogs movably mounted on the slide in substantial transverse alignment with body blank feed means and capable of limited movement into and out of an adjacent line of feed at one side of said slide, a series of disappearing members in line with the dogs spaced apart less than the stroke of the slide and adapted to move the dogs transversely into and out of the line of feed on feed and return stroke respectively.

86. In a machine of the class described, a feed slide, a feed dog movably mounted thereon for limited movement into and out of a parallel line of feed at one side of the slide, a pair of disappearing members in line with the dog spaced apart less than the stroke of the slide, and adapted to move the dog transversely into and out of the line of feed on feed and return stroke respectively.

87. In a machine for forming composite can bodies, a table top forming a way for seaming strips, means for forming seaming strips at a level above the table top, means for dropping the seaming strips to the level of the table top, and for reversing them in so doing, a magazine supporting a pile of can body blanks above the table top at a point opposite the place where the seaming strips are reversed, inclines from the magazine to the level of the table top forming a way for can body blanks parallel to the way for the seaming strips, the blank supporting means in the magazine and the incline on the side next the way for the seaming strip being spaced from the table top, a feed slide having transversely aligned feed means for said can body blanks and seaming strips respectively, the feed means for the strips being a finger projecting laterally from the feed slide into said space, and means shifting the seaming strip crosswise into line with said feed finger.

88. In a machine for forming composite can bodies, a station at which is located a magazine for can body blanks, a feed slide having longitudinally spaced feed means for acting on said blanks and correspondingly spaced feed means for feeding forward endwise in the same direction seaming strips, a station at which is located mechanism for overlapping adjacent edges of a can body blank and seaming strip and for securing them together, said slide acting to feed the can body blanks and seaming strips to said station and the composite blanks beyond it, the means for feeding the seaming strips comprising an integral feed finger and a plurality of lateral feed fingers each having pivoted thereon for limited transverse movement a feed dog, a series of disappearing spring pressed members in fixed locations in the path of said dogs and spaced apart less than the stroke of the slide so that each dog passes two such members in each stroke, whereby each dog is shifted to feed position at the beginning of the feed stroke and out of line with the seaming strips at the beginning of the return stroke.

89. In a machine for forming composite can bodies, means for supporting a can body blank and a formed seaming strip side by side with their adjacent edges parallel, means for giving said blank and strip relative edgewise and crosswise movement to bring their adjacent edges only into overlapping relation, devices for relatively guiding said blank and strip during said operation, and means for clinching the overlapping edges together with the unattached edge of the seaming strip extending out beyond the edge of the blank.

90. In a machine for forming composite can bodies, a support for a relatively rigid seaming strip and means at each end and at one side of the strip for keeping it in the desired position, means for supporting a can body blank, a pusher slide, and means for reciprocating it toward and from the strip to overlap the edge of the body blank and strip and strip-clinching devices operating thereafter.

91. In a machine for forming composite can bodies means for supporting a relatively rigid seaming strip and a can body blank, a stop spring-pressed against an edge of one of said articles, a stop spring-pressed toward the supporting means and contacting the opposite edge of said article, a pusher slide reciprocating in a line parallel to the edges contacted by said stops to cause the adjacent edges of said blank and strip to overlap, means to reciprocate the pusher slide, and means for securing the overlapping edges together.

92. In a machine for forming composite can bodies, means for supporting a blank and a seaming strip resting on a portion of itself of double thickness, means for moving said blank edgewise into overlapping relation with said strip, and devices acting during the operation of said blank-moving means to deflect the edge of the blank adjacent the strip beyond the plane of the portion of the strip of double thickness and to guide it with relation thereto, and means for clinching the strip to the body blank.

93. In a machine for forming composite can bodies, means for supporting side by side a can body blank and a sheet metal seaming strip having a back of double thickness on which it rests and divergent free flanges projecting upward therefrom and forming therewith re-entering angular side spaces, means for aligning the adjacent edge of the can body blank with the angular space between the double back and the adjacent free flange of the strip, means for maintaining the seaming strip in parallelism with the edge of the can body blank, means for relatively moving the can body blank and strip edgewise into overlapping relation with the edge of the blank within the adjacent angular space, and means for clinching the strip to the blank.

94. In a machine for forming composite can bodies, means for supporting side by side a can body blank and a sheet metal seaming strip having a back of double thickness on which it rests and divergent free flanges projecting upward therefrom and forming therewith reentering angular side spaces, means for aligning the adjacent edge of the can body blank with the angular space between the double back and the adjacent free flange of the strip, means for maintaining the seaming strip in parallelism with the edge of the can body blank, holding devices for retaining the strip against endwise displacement, means for relatively moving the can body blank and strip edgewise into overlapping relation with the edge of the blank within the adjacent angular space, and means for permanently gripping said edge between the double back and adjacent flange of the strip.

95. In a machine for forming composite can bodies, means for supporting a can body blank and a sheet metal seaming strip side by side with the strip parallel to the adjacent edge of the blank, said seaming strip having a doubled back on which it rests and divergent free flanges projecting upward therefrom and forming therewith reentering angular spaces, a member extending lengthwise of the strip on the side away from the can body and having an angular projection extending into and fitting the adjacent angular space of the strip, a blank-deflecting surface inclined upward and toward the strip and carried by the support under the body blank near its edge adjacent the strip, and directing the blank upward to a plane above that of the edge of the doubled back of the seaming strip so as to place the edge of the blank in registry with the adjacent angular space of the strip, means for relatively moving the body blank and strip edgewise to locate them in overlapping relation with the edge of the body blank in said space, and means for gripping the edge of the body blank between the free flange and the doubled back of the strip.

96. In a machine for forming composite can bodies, means for supporting side by side a can body blank and a sheet metal seaming strip having a back of double thickness on which it rests and divergent free flanges projecting upward therefrom and forming therewith re-entering angular spaces, a member extending lengthwise of the seaming strip on the side away from the can body blank and projecting into the angle between the back of the strip and the adjacent free flange, deflecting means under the body blank near its edge next said member opposing to the blank a surface inclined upward toward the strip for aligning the blank with the adjacent angular space of the seaming strip, and means for moving the body blank transversely to place its edge in said space.

97. In a machine for forming composite can bodies, means for supporting side by side a can body blank and a sheet metal seaming strip having a back of double thickness on which it rests and divergent free flanges projecting upward therefrom and forming therewith angular spaces, a member extending lengthwise of the seaming strip on the side away from the can body blank and projecting into the angle between the back or double portion of the strip and the adjacent free flange, deflecting means under the body blank near its edge next said member opposing to the blank a surface inclined upward and toward the strip for aligning the blank with the adjacent angular space of the strip, spring means for pressing the deflecting means toward the blank, stop means for limiting such movement, a hold down strip above said blank and deflecting means cooperating with the latter to guide the edge of the blank, means for moving the body blank transversely to place its edge in the adjacent angular space of the seaming strip, and means for forcing the adjacent flange against the edge of the blank to permanently grip the latter between itself and the back of the strip.

98. In a machine for forming can bodies, means for supporting side by side a can body blank and a seaming strip, an upwardly spring pressed blank-edge-deflecting block mounted in the support beneath the can body-blank near its edge next the seaming strip and a hold down above the blank and the deflecting block, a pusher slide, and means to reciprocate the same toward and from the seaming strip to cause the edge of the body blank to overlap the edge of the strip, said hold down and block cooperating during this cross feed to guide the blank between them into proper relation to the strip.

99. In a machine for forming can bodies, in combination with means for supporting a can body blank and a seaming strip side by side and with seaming-strip clinching mechanism, and cross means for the blank, a body-blank-edge-deflecting or guiding block mounted in the supporting means beneath the body blank and extending lengthwise adjacent the edge of the blank next the seaming strip and bevelled upward and outward, spring pressed upward and provided with stop means for limiting said upward movement.

100. In a machine for forming composite can bodies, means for supporting a seaming strip in a definite location, a slide, means for reciprocating it to feed can body blanks step by step in the direction of the length of the seaming strip to a point opposite said location, a blank retarding and hold down frame extending in the direction of the feed and having strips resting on the blank near its opposite edges, means substantially opposed to and cooperating with the adjacent hold down strip and spring pressed against the underside of the blank adjacent the seaming strip to move the edge of the blank next the strip out of line with the edge of the seaming strip, retarding dogs on the hold down frame, a pusher slide, means for reciprocating it crosswise of the other feed to overlap the body blank and strip, and strip clinching means operated after said overlapping.

101. A machine for forming composite can bodies comprising means for simultaneously feeding a body blank and a seaming strip step by step side by side in the direction of the length of the latter, said seaming strip having a doubled back on which it rests and free flanges projecting upward therefrom, strip-clinching mechanism at one side of the feed path, a transverse pusher located at the side of the path of the body blank remote from the strip feed at a point opposite the strip-clinching mechanism, a longitudinal guide adjacent the strip-clinching mechanism for retaining the strip in position with its free flanges projecting upward, means for masking the adjacent edge of the double back of the seaming strip to insure the edge of the blank clearing the doubled part of the seaming strip, means to operate the side pusher to move the body blank into the angle between the adjacent free flange and the adjacent doubled part; and means for thereafter operating the strip-clinching mechanism to clinch the said free flange onto the body blank and thereby permanently secure the seaming strip thereto.

102. A machine for forming composite can bodies comprising means for simultaneously feeding a body blank and a seaming strip step by step side by side in the direction of the length of the latter, said seaming strip having a doubled back or base on which it rests and free flanges projecting therefrom, strip-clinching mechanism at one side of the feed path, a transverse pusher slide located at the side of the path of the body blank remote from the strip feed at a point opposite the strip-clinching mechanism, a longitudinal guide and transverse stop adjacent the strip-clinching mechanism for retaining the strip in position with its free flanges projecting upward, spring operated means for holding the strip during clinching, upwardly spring pressed blank deflecting means located in the table top beneath the body blank adjacent its edge next the seaming strip and having its upper surface inclined upward and toward the strip to insure the edge of the blank clearing the doubled part of the seaming strip, means to operate the side pusher to move the body blank into the angle between the adjacent free flange and the adjacent doubled part, and means for thereafter operating the strip-clinching mechanism to clinch the said free flange onto the body blank and thereby permanently secure the seaming strip thereto.

103. In a machine for forming into can bodies composite can body blanks having secured to one edge thereof a seaming strip having along its free side a re-entering space, a horn, movable formers mounted adjacent said horn for conforming said blank to the horn, means for aligning the free end of the blank with said re-entering space in the seaming strip and for inserting it during the close of the conforming operation edgewise into said re-entering space, means for closing said re-entering space on the free end of the blank, and transfer means, whose operation is coordinated with that of the movable formers, for supplying a succession of composite can body blanks to the horn and for advancing the finished can bodies therefrom.

104. In a machine for forming can bodies out of composite can body blanks having secured to one edge thereof a sheet metal seaming strip having a free flange projecting away from the rest of the strip and forming therewith a re-entering space, a former horn, means for conforming the blank thereto with the seaming strip flat against the horn, means for taking up slack in the free end of the blank in the conforming operation, edge locating and guiding means cooperating with the conforming means near the close of the conforming operation to align the free edge of the blank with the re-entering space in the seaming strip and maintain such alignment as the conforming means gives the end of the blank a rapid edgewise movement into said space, and means for clinching the flange on the blank edge.

105. In a machine for forming into can bodies composite can body blanks having attached to one edge a seaming strip having along its free side a re-entering space, a horn, movable formers mounted adjacent said horn for conforming said blank to the horn, means for clinching the seaming strip to the free edge of the formed blank, opposed cooperating means on said horn and clinching means respectively for aligning the free end of the blank with the adjacent re-entering space in the seaming strip and for guiding it during the close of the conforming operation edgewise into said re-entering space, and means for actuating said formers to conform the composite blank to the horn and to move the free end of the blank rapidly edgewise into the re-entering space of the strip just prior to clinching.

106. In a machine for forming composite can bodies, mechanism for forming a can body comprising a horn, formers fulcrumed adjacent said horn for conforming thereto a can body blank having secured to one edge thereof a seaming strip having its back doubled and a free flange projecting outward from the back portion at an angle thereto and forming a re-entering angular space extending lengthwise of the strip, and means for swinging the formers about their fulcrums to shape the can body to the horn, said horn having a seaming strip-masking guide rib providing a shoulder adjacent the location occupied by the seaming strip when the part of the blank to which it is attached has been conformed to the horn and having an edge-deflecting surface in rear of said shoulder extending outward and toward the adjacent angular space in the seaming strip to guide the free edge of the blank outward beyond the double portion of the seaming strip toward said angular space, and means for clinching the flange onto the free edge of the blank.

107. In a machine for forming can bodies, a former horn, means for periodically giving one side of the horn a false contour exterior to the true contour and for temporarily rigidly maintaining said false contour, formers for conforming a can body blank to the horn with its false contour and then to the true horn contour, and means for securing the ends of the formed blank together when the blank has been conformed to the true contour.

108. In a machine for forming can bodies, a former horn having true contour except adjacent one corner, said corner being formed by a movable member, means for periodically moving it outward to a position beyond the true contour of the horn and for maintaining it temporarily in that position until the close of each forming operation, means for conforming a can body blank to the permanent contour of the rest of the former horn and to the temporary false contour formed by the outwardly moved member, the means for actuating the movable member permitting it to be thereupon moved inward to allow the adjacent end of the can body blank to be conformed to the true contour of the horn, and means for thereafter permanently securing the ends of the body blank together.

109. In a machine for forming can bodies out of composite can body blanks having a free end and an end to the edge of which is permanently secured a sheet metal seaming strip having a free flange projecting away from the rest of the strip, a former horn, means for enlarging the former horn contour at the side on which the free end of the composite body blank is to be formed and for rigidly maintaining the enlarged contour until the free end of the blank has been conformed to it, means for conforming the seaming strip end of the can body blank to the former horn and thereafter the free end of the blank to the true former horn contour, and means for securing the free edge of the seaming strip to the free edge of the can body blank.

110. In a machine for forming composite can bodies, a former horn having a movable member providing part of its contour surface and means for moving said member outward and maintaining it until near the close of the forming operation in a fixed position wherein it establishes a false horn contour, means for successively conforming to the horn opposite ends of a composite can body blank to the first of which to be conformed is attached a seaming strip having a re-entering angular space extending lengthwise thereof on its free side and thus opposed to the other end of the blank, edge-locating and guiding means cooperating with the conforming means at the close of the conforming operation to locate the free edge of the blank in said re-entering angular space, and means for clinching the strip on said edge.

111. In a machine for forming composite can bodies, a former horn having a pivoted member providing part of its contour surface, and cam-operated means for swinging said pivoted member outward and maintaining it until near the close of the forming operation in a fixed position wherein it establishes a false horn contour, means for conforming to the horn opposite ends of a composite can body blank to one of which is attached a seaming strip, and means for securing the free edge of the strip and blank together.

112. In a machine for forming composite can bodies, a former horn having a pivoted member providing part of its contour surface, and cam-operated means for swinging said pivoted member outward to establish a false horn contour, means for successively conforming to the horn opposite ends of a composite can body blank to the first of which to be conformed is attached a seaming strip having a re-entering angular space extending lengthwise thereof on its free side, means for aligning the free edge of the blank with this re-entering space whereby in the conforming operation the free edge of the blank is moved edgewise into said space, and means for securing it therein.

113. In a machine for forming composite can bodies, a former horn having at one side a pivoted wing forming part of the horn contour, and a longitudinal rib a little to one side of the central longitudinal plane of the horn toward said wing having an abrupt front face and having its back surface inclined along and outward from the adjacent face of the horn toward said plane.

114. In a machine for forming composite can bodies, a former horn having at one side a movable wing forming part of the horn contour and a rib extending longitudinally of the horn beyond the free end of said wing and having an abrupt front face forming a shoulder on the side away from the wing and having its rear side extending gradually outward from the horn and away from the free end of the wing toward the shoulder.

115. In a machine for forming composite can bodies, a former horn having a longitudinally extending wing pivoted at one side thereof and whose surface forms part of the horn contour, a lever located in a cavity in the horn and having its power applying end adjacent the inner side of said movable wing, and operative power connections to the other arm of the lever.

116. In a machine for forming composite can bodies, a former horn, a pair of formers fulcrumed adjacent the same, levers extending transversely of the horn each operatively connected to one of said formers, means for operating said levers comprising a transverse cam shaft, a cam on said shaft for each lever, an operating rod associated with each cam, and a guide for each operating rod restricting it to endwise movement, a link being interposed between the end of each operating rod and its lever to allow for transverse movement of the point of connection with the lever.

117. In a machine for forming composite can bodies, a feed-way for supporting on its back a seaming strip having free flanges extending lengthwise of the strip and projecting upward and outward therefrom, means for feeding the strip endwise on said way, means for associating said seaming strip with a can body blank with their edges in overlapping relation, means for clinching to the edge of the can body blank the free flange adjacent thereto, a stop located at the far side of the clinching means in line with the endwise feed of the strip and spring-pressed in reverse direction to said feed, said stop having its underside spaced above the feed-way to leave room for the passage under it of the back of the strip but having its stop face opposed to the free flange adjacent the can body blank and having the part which would otherwise be opposite the other free flange cut away to permit the feed beyond the clinching means of the composite blank formed by the clinching operation.

118. An organized machine for forming can bodies comprising means for applying a sheet metal seaming strip to a can body blank, and means for forming the composite blank thus produced into the desired can body shape and for thereupon again securing the seaming strip to the formed can body blank to complete the can body, said several means being correlated for harmonious operation.

119. In a machine for forming can bodies by associating in can body form fibrous stock and seaming strip having oppositely facing longitudinal side recesses, mechanism for supporting and relatively moving such strip and stock to locate opposite edges of the stock in said respective side recesses of the strip and to close the respective recesses thereon, said mechanism including can body forming and strip recess closing means.

120. An organized machine for forming can bodies comprising means for supporting and aligning transversely a can body blank and a relatively rigid seaming strip, means for overlapping adjacent longitudinal edges of said blank and strip, means for securing said edges permanently together when thus overlapped to form a composite can body blank having one edge secured to the seaming strip and the opposite edge free, a former horn and can body forming means for shaping the composite blank thus formed into can body shape with the free edge of the can body blank overlapped with the free edge of the seaming strip, means for securing said overlapped edges permanently together, and means for advancing the can body off the horn.

121. In a machine of the class described, an elevated support for a strip, movable means cooperating with said support for supporting the strip in a position in which it projects beyond the support and is overbalanced, and means for moving said movable means to release the strip for reversal by falling.

122. In a machine of the class described, an elevated support for a strip, said support being narrower than the strip, movable means cooperating therewith to support the strip on the support in a position in which it projects beyond the support at one side and is overbalanced toward that side, and means for moving said movable means to release said strip for reversal by falling.

123. In a machine of the class described, an elevated support for a seaming strip, releasable means for retaining the strip on said support with its center of gravity beyond the support, a support at a lower level to which on release of the retaining means the strip falls reversing itself in so doing, and means at the lower level for aligning the reversed strip.

124. In a machine of the class described, a reciprocatory feed slide having its front edge adapted to a seaming strip to feed the same sidewise, and means for feeding the strip endwise along the advanced front end of the feed slide which in that position acts as a guide.

125. An organized machine for forming composite can bodies comprising means for feeding a sheet metal seaming strip and a can body blank forward side by side together in the direction of the length of the strip, and means for associating said strip and blank in overlapping relation and for securing them together.

126. In a machine for forming composite can bodies, a feed slide having feed means for can body blanks and for seaming strips respectively for advancing them both in adjacent separated feed paths, and means for reciprocating the feed slide.

127. In a machine for forming composite can bodies, mechanism for forming composite can body blanks including a reciprocatory feed slide having feed means for can body blanks and for metal seaming strips respectively for advancing them both in adjacent lines of feed, and means for associating and permanently securing together the thus advanced can body blank and seaming strip and means for forming the composite blank into can body shape and for permanently securing it therein with its seaming strip edge and its opposite edge overlapping.

128. In a machine of the class described, blank severing means, a feed slide, means for reciprocating it toward and from said blank severing means, a fore and aft series of feed dogs on said slide spaced apart and having their feed faces in line, the foremost dog being pivoted and having its body in a plane at one side of the center plane of the bodies of others of the feed dogs and having its feed face extending across said plane.

129. In a machine of the class described, blank treating means, a blank feed thereto, and a slower blank feed to the blank feed to the blank treating means and co-ordinated therewith, said second named feed including in its operating connections quick action means for delivering the blank to the first named feed without interference with its operation, and an overstrain release spring in said connections.

130. In a machine of the class described a feed slide for blanks, a stop for blanks, means for reciprocating said slide endwise to move the blank against the stop comprising a power shaft and operative connections therefrom to the slide including a rod reciprocating with respect to said slide and a spring interposed between said rod and slide and compressible by continued movement of the rod after the forward movement of said feed slide has ceased.

131. In a machine of the class described, two supports for a seaming strip, one above the other, and means for moving the strip into a position on the higher support in which it is parallel with an edge of the support and overbalanced outward therefrom and causing it to turn over sidewise and outward thereby reversing itself as it drops to the lower support.

132. In a machine of the class described, a feed way for a seaming strip, a support for the seaming strip below said feed way, a guide extending lengthwise along said feed way and preventing premature dropping of the seaming strip to the said support, means for feeding the seaming strip endwise along the feed way and guide, and means for dropping the strip to said support and thereby reversing it including means for periodically removing said guide.

133. In a machine for making can bodies, means for forming a seaming strip, means for reversing it, and means for securing it to a can body blank.

134. In a machine for forming can bodies, means for continuously associating and securing together in pairs seaming strips and can body blanks, and means co-ordinated therewith for continuously delivering individual blanks and strips to said associating and securing means.

135. In a machine for forming can bodies, means for continuously associating and securing together in pairs sheet metal seaming strips and can body blanks, means for successively forming said respective pairs into can body form and securing them therein, and feeding and transfer means for causing continuous progress through the machine of said strips, blanks, pairs and finished can bodies.

136. In a machine for forming can bodies, means for feeding blanks successively, means for successively sub-dividing each blank so fed into sub-blanks and for forming each sub-blank into a seaming strip, transfer means successively feeding said seaming strips, means for feeding can body blanks successively, means for continuously and successively associating and securing together in pairs said individual can body blanks and seaming strips, and can body forming means for successively and continuously forming said pairs into can body shape and securing them therein.

137. In a machine of the class described, adjacent slides having lost motion operative connection, a fore and aft series of movable feed dogs carried by one of the slides, means for moving said slides together alternately in opposite directions and for perodically giving them relative motion transversely of the path of reciprocation to cause projection of the feed dogs into feed position and their retraction out of feed position.

138. In a machine of the class described, adjacent slides having lost motion operative connection and one of which drives the other alternately in opposite directions, a fore and aft series of feed dogs carried by one of said slides and operatively connected to the other for periodical actuation thereby into and out of the line of feed, and means for reciprocating the driving slide.

139. In a machine of the class described, two linearly reciprocable members having lost motion operative connection, a feed dog adapted to push an article forward on alternate strokes and operatively related to one of said members but carried by the other, and means to cause one of said members to reciprocate and by virtue of said lost motion operative connection to move relatively to the other during part of its stroke in each direction and, during part of its stroke in each direction, to carry the other with it, thereby periodically causing the feed dog to shift into and out of feed position and accomplishing the feed and return stroke.

140. In a machine of the class described, a feed dog carrier, a feed dog movably mounted with respect to said carrier, means for reciprocating said carrier and for projecting said feed dog into the line of feed in advance of the article to be fed and for retracting it therefrom before it can strike the article on the return stroke.

141. In a machine of the class described, a slotted feed way, a feed dog carrier mounted beneath said feedway, a dog movably mounted on said carrier and when in feed position extending through the slot in the feed way, and means for reciprocating said carrier and dog lengthwise of the slot, and for periodically shifting said feed dog out of the slot into feed position and into the slot out of feed position.

142. An organized machine for forming composite can bodies comprising means for clinching a seaming strip to an edge of a can body blank with the free edge of the seaming strip projecting outward from that edge of the blank, mechanism for feeding seaming strips and can body blanks to said clinching means, means for successively forming the composite blanks thus produced into can body shape with the projecting edge of the seaming strip and the opposite edge of the composite blank overlapping and for clinching them together in that relation, and means for successively delivering the completed can bodies by advancing them endwise, the said several means being aptly co-ordinated for harmonious continuous operation.

143. In a machine for forming composite can bodies, mechanism for giving a seaming strip having longitudinal side recesses and a can body blank relative motion into a position in which an edge of the can body blank occupies one of said recesses, means correlated with said mechanism for thereupon closing said recess on said edge to fasten them permanently together, while leaving the other recess open, and means for feeding seaming strips and can body blanks to said mechanism.

144. An organized machine for forming composite can bodies comprising a former horn, means for feeding to said horn a succession of composite blanks each having a relatively rigid seaming strip secured to one edge and projecting outward therefrom, mechanism for successively forming the composite blanks about the horn into can body shape each with its free edge overlapping the seaming strip, means for thereupon securing the seaming strip and the free edge permanently together, and devices for successively delivering the completed can bodies by advancing them off the horn lengthwise thereof.

145. In a machine of the class described, a feed dog having a feed face, means for giving said dog linear reciprocation to push an article forward on alternate strokes and means of operative connection between said first named means and said feed dog to shift its feed face on successive strokes respectively into feed position in line with the article and out of feed position.

146. In a machine for forming can bodies by associating and permanently securing together in pairs fibrous can body blanks and sheet metal seaming strips having side spaces or recesses, means for giving relative movement to such strips and blanks to associate them in successive pairs with an edge of the blank in one of the side spaces of the strip, devices operative successively on each associated strip and blank to clamp said edge in said side space, and means for successively removing the clamped pairs from the clamping devices.

147. In a machine for forming can bodies, means for supporting relatively rigid seaming strip and fibrous can body stock side by side, said seaming strip having at each side an outwardly facing longitudinally extending space or recess flanked at its inner side by a free flange, means for giving said strip and fibrous stock transverse relative movement toward each other to locate the adjacent edge of the fibrous stock in the adjacent strip space or recess, means for clamping the adjacent free strip flange on to said edge, and means for forming the can body and for clamping the other free strip flange on the opposite edge.

148. In a machine for forming composite can bodies, a feed dog carrier having spaced feed dogs for can body blanks and adjacent spaced feed dogs for seaming strips for simultaneously advancing in pairs can body blanks and seaming strips in separate adjacent feed paths, and means for actuating the feed dog carrier.

149. In a machine for forming can bodies from composite blanks consisting of a fibrous body blank having a sheet metal seaming strip formed along its edges with side spaces or recesses in one of which an edge of the blank is clamped and having a free flange flanking its other side space, a former horn and means associated therewith for forming successive composite blanks into permanent can body shape, with the free end of the body blank clamped in the space or recess between the free flange and the body of the strip, and means for advancing a succession of composite blanks to said horn in the direction of its length, and of further advancing the completed can bodies successively from said horn in the same direction.

150. A machine for forming composite can bodies comprising transfer means for advancing side by side in pairs spaced fibrous can body blanks and spaced sheet metal seaming strips having at each side longitudinally extending spaces or recesses flanked by free flanges, a cross feed for giving relative movement to the members of each successive pair to associate its strip and can body blank with the adjacent edge of the can body blank in the adjacent side space of the seaming strip, means for clamping said edge between the body of the strip and the free flange, a longitudinally extending former horn and mechanism associated therewith for forming into permanent can body shape the successive composite blanks thus produced, means for feeding the composite blanks in succession to the horn, and means for successively removing finished can bodies from said horn by further movement in the same direction.

151. A machine for forming can bodies, means for feeding in the direction of its length, a sheet metal seaming strip having along each side a space or recess flanked at its inner side by a free flange, a guide extending in the direction of the feed and projecting into the adjacent side recess of such strip for contact therewith, said guide acting also as a cross stop or backing for the strip, a cross feed for locating the edge of a fibrous can body blank in the recess of the strip on the side opposite the said guide and stop, and means for clamping the free flange onto the edge of the strip to permanently retain it in the recess.

152. In a machine for forming can bodies, means for forming sheet metal seaming strip with adjacent oppositely facing longitudinal side spaces or recesses, mechanism for relatively moving such seaming strip and fibrous can body stock to locate opposite edges of the fibrous stock in said respective spaces or recesses, said mechanism including can body forming means and means for clamping said edges in said recesses.

153. In a machine for forming can bodies, means for forming sheet metal seaming strips with their backs on top and having longitudinal spaces or recesses flanked with downwardly extending free flanges, mechanism for reversing said strips to locate them on their backs, means for associating individual strips and blanks with an edge of a blank in one of said side spaces, and means for clamping the edge of the blank in said space.

154. In a machine of the class described, a feed way for seaming strips having longitudinal recesses, a guide for the seaming strips extending along said feed way, means for feeding seaming strips lengthwise along said guide, a dog projecting beyond the face of said guide into the adjacent recess of the passing seaming strip and spring pressed onto its base and, after the strip has been advanced beyond the dog, into place behind the strip to prevent its retraction.

155. In a machine for forming can bodies from composite blanks each made up of a fibrous blank having secured to one of its edges a sheet metal seaming strip along whose free edge runs a recess flanked on the inner side by a free flange, can body forming devices including means for taking up slack in the composite blank and for inserting the free end of the blank edgewise into the space along the free edge of the strip, means for clinching the free flange onto the edge thus inserted, and means for supplying a succession of said composite blanks to the can body forming devices.

156. In a machine for forming composite can bodies, means for supporting a blank and a sheet metal seaming strip resting on its back or base, said strip having longitudinal side recesses, means for moving an edge of said blank edgewise into one of said side recesses, and means masking the base of the strip during the operation of said blank-moving means to insure entry of the blank edge into the recess without obstruction by the edge of the base of the strip, and means for clinching the strip to the body blank.

157. In a machine for forming into can bodies composite can body blanks having secured to one edge thereof a seaming strip having along its free side a re-entering recess, a horn, means for feeding thereto in spaced relation a succession of such composite blanks, formers fulcrumed adjacent said horn for successively conforming said blanks thereto, means for actuating said formers giving the former acting upon the end of the blank to which the seaming strip is attached a lead over the other former to conform that end of the blank to the horn before the other or free end of the blank has been conformed to it, means on the horn masking the back or base of the attached strip, when the strip end of the blank has been conformed to the horn with the back of the strip against the horn and its open recess facing the other end of the blank, means for aligning the free end of the blank with said re-entering recess in the seaming strip and for inserting said free end edgewise into said recess during the close of the conforming operation on that end of the blank, and means for thereupon permanently closing the said recess on the edge of the blank.

158. In a machine for forming into can bodies, composite can body blanks having secured to one edge thereof, a seaming strip having along its free side a re-entering recess, a horn, a movable member associated with the horn and providing part of the horn contour, means for locating it beyond the true horn contour, movable formers adjacent the horn and operating means therefor for conforming the seaming strip end of the blank to the horn and for conforming the free end of the blank to the enlarged or false horn contour, the blank contacting portions of the former for the free end of the blank and of the movable member when so conformed extending transversely inward toward the seaming strip and they and their subsequent path of movement being such as to align the free end of the blank with the re-entering recess and to insert it edgewise thereinto as the free end of the blank is conformed to the true contour of the horn, and means for thereupon permanently closing the recess on the edge of the blank.

159. In a machine for forming can bodies out of composite can body blanks having secured to one edge thereof a sheet metal seaming strip having a free flange projecting away from the rest of the strip and forming therewith a longitudinal recess, a former horn, a former at each side of the horn fulcrumed on the frame, power means for operating said formers including spring means between the power and the formers, one of the formers acting to conform the seaming strip end of the blank to the horn with the back of the seaming strip flat against the horn and having a lead over the other former, a movable member providing part of the horn contour and means to move it beyond the true contour of the horn, the power actuated spring means referred to acting to hold the free end of the blank against said movable false contour portion of the horn, the back of the strip being then against the horn and its longitudinal recess facing the free end of the blank, the contour of the blank contacting portions of said former and movable portion and their path of movement from the extended or false contour position being such as to align the free end of the blank with the angular recess and to insert it edgewise thereinto during said movement, and means for thereupon clinching the flange of the seaming strip on the blank edge.

160. In a machine of the class described a feedway, a blank stop and shear blade extending lengthwise on opposite sides of said feedway, means to feed a blank past said blade and against said stop, means for shearing the end of the blank, a feed dog carrier slide between said blade and stop, means for reciprocating the feed dog carrier in the direction of the length of said stop and blade, and means periodically operative in alternate strokes of said feed dog carrier for projecting the dog into feed position and for withdrawing it therefrom.

161. In a machine of the class described, a magazine for blanks, inclined feedways extending downward and forward from said magazine, a longitudinal feedway at one side of the inclined feedways, a reciprocatory slide having means for feeding said blanks from said magazine successively along said inclined feedways and a member projecting from the slide into space beneath one of said inclined feedways and into a separate adjacent line of feed along the said longitudinal feedway.

162. In a device of the character described, a magazine for blanks, inclined feedways extending downward and forward from said magazine, a feedway extending longitudinally at one side of the inclined feedways and at a lower level, a reciprocatory feed slide having feed means for feeding the blanks and having a part projecting from the slide into space beneath the adjacent inclined feedway and having a feed dog extensible into and retractible from an adjacent line of feed, on reciprocation of the feed slide in different directions.

163. In a machine of the class described, inclined feedways extending downward and forward to a lower level, a feed slide mounted for reciprocation at the lower level, a fore and aft series of spaced feed dogs movably mounted on said slide for feeding blanks down said inclined feedways to the lower level, said feed slide having another cooperating series of feed dogs supported on lateral extensions of said slide into space beneath one of said inclined feedways, at least one of said dogs being movably mounted on the under side of the lateral extension on which said feed dog is carried, and disappearing spring pressed feed dog operating means in fixed locations within the limits of the stroke of the slide for shifting the movable dog on said lateral arm into and out of a laterally adjacent line of feed.

164. In a machine of the class described, a feedway on which blanks are fed, a feed dog carrier, means for reciprocating said carrier lengthwise thereof, a fore and aft series of feed dogs mounted on said carrier, movable means actuated alternately in opposite directions by the reciprocation of the carrier for alternately and periodically advancing said dogs into the line of feed and retracting them therefrom.

165. In a machine of the class described, a feed slide, means for reciprocating said slide, a feed dog movably mounted thereon and extending into a line of feed during the feed movement, and disappearing means having fixed location within the limits of the stroke and into effective operative relation with which said dog is brought on strokes in respectively different directions to move the dog with reference to the slide and retract it from and project it into said line of feed.

In testimony whereof, I have signed this specification.

VICTOR HENDRICKSON.

CERTIFICATE OF CORRECTION.

Patent No. 1,807,843.  Granted June 2, 1931, to

VICTOR HENDRICKSON.

It is hereby certified that error appears in the printed specification of the above numbered patent requiring correction as follows: Page 15, line 3, claim 27, strike out the word "rear"; page 18, line 24, claim 58, for the word "strip" first occurrence read trip, and line 33, claim 59, for "strip" read trip; page 19, line 57, claim 69, for the word "portions" read portion; and that the said Letters Patent should be read with these corrections therein that the same may conform to the record of the case in the Patent Office.

Signed and sealed this 4th day of August, A. D. 1931.

(Seal)

Wm. A. Kinnan,
Acting Commissioner of Patents.